US010688751B2

(12) United States Patent
Fukuda et al.

(10) Patent No.: US 10,688,751 B2
(45) Date of Patent: Jun. 23, 2020

(54) FOAM STRUCTURAL MATERIAL, RESIN PANEL, AND METHOD FOR MANUFACTURING A RESIN PANEL

(71) Applicant: KYORAKU CO., LTD., Kyoto-shi, Kyoto (JP)

(72) Inventors: Tatsuya Fukuda, Tokyo (JP); Tadatoshi Tanji, Tokyo (JP); Yoshihiro Yamasaki, Tokyo (JP)

(73) Assignee: KYORAKU CO., LTD., Kyoto-shi (JP)

( * ) Notice: Subject to any disclaimer, the term of this patent is extended or adjusted under 35 U.S.C. 154(b) by 50 days.

(21) Appl. No.: 15/970,681

(22) Filed: May 3, 2018

(65) Prior Publication Data

US 2018/0250911 A1 Sep. 6, 2018

Related U.S. Application Data

(62) Division of application No. 14/651,169, filed as application No. PCT/JP2013/081431 on Nov. 21, 2013, now Pat. No. 9,987,821.

(30) Foreign Application Priority Data

Dec. 28, 2012 (JP) .................................. 2012-288328

(51) Int. Cl.
*B32B 3/18* (2006.01)
*B32B 5/18* (2006.01)
(Continued)

(52) U.S. Cl.
CPC .............. *B32B 5/18* (2013.01); *B29C 65/028* (2013.01); *B29C 66/433* (2013.01);
(Continued)

(58) Field of Classification Search
CPC ....... B32B 5/08; B32B 2305/022; B32B 3/30; B32B 5/18; B32B 3/02; B32B 3/06;
(Continued)

(56) References Cited

U.S. PATENT DOCUMENTS 5,129,628 A 7/1992 Vesper

FOREIGN PATENT DOCUMENTS

JP 08-080538 A 3/1996
JP H11216789 A * 8/1999
(Continued)

OTHER PUBLICATIONS

Machine translation of cited reference JPH11-216789 (Year: 1999).*
(Continued)

*Primary Examiner* — Donald J Loney
(74) *Attorney, Agent, or Firm* — Maier & Maier, PLLC

(57) ABSTRACT

A foam structural material includes a first core material and a reinforcing material. The first core material has a first portion of a linear groove part formed along an edge of the first core material. The reinforcing material has a first side fitted to the first portion of the linear groove part. The first portion of the linear groove part includes a first engagement plane. The first engagement plane is engaged with the reinforcing material and has one or a plurality of projections formed thereon.

5 Claims, 18 Drawing Sheets

(51) Int. Cl.
*B29C 65/00* (2006.01)
*B29D 99/00* (2010.01)
*B29C 65/02* (2006.01)
*B29C 70/46* (2006.01)
*B29C 70/08* (2006.01)
*B32B 3/30* (2006.01)
*B32B 37/18* (2006.01)
*B29L 7/00* (2006.01)
*B29C 65/50* (2006.01)
*B29C 65/56* (2006.01)
*B29L 31/00* (2006.01)
*B32B 3/02* (2006.01)
*B32B 3/06* (2006.01)
*B29K 77/00* (2006.01)

(52) U.S. Cl.
CPC ...... *B29C 66/727* (2013.01); *B29C 66/81427* (2013.01); *B29C 66/81431* (2013.01); *B29C 66/83221* (2013.01); *B29C 70/086* (2013.01); *B29C 70/46* (2013.01); *B29D 99/0021* (2013.01); *B32B 3/30* (2013.01); *B32B 37/185* (2013.01); *B29C 65/5057* (2013.01); *B29C 65/5071* (2013.01); *B29C 65/5085* (2013.01); *B29C 65/564* (2013.01); *B29C 66/1122* (2013.01); *B29C 66/1142* (2013.01); *B29C 66/71* (2013.01); *B29C 66/81415* (2013.01); *B29C 70/462* (2013.01); *B29K 2077/00* (2013.01); *B29L 2007/002* (2013.01); *B29L 2031/776* (2013.01); *B32B 3/02* (2013.01); *B32B 3/06* (2013.01); *B32B 2305/022* (2013.01); *Y10T 428/19* (2015.01); *Y10T 428/233* (2015.01); *Y10T 428/2457* (2015.01); *Y10T 428/24496* (2015.01)

(58) Field of Classification Search
CPC ............... Y10T 428/233; Y10T 428/19; Y10T 428/2448; Y10T 428/24496; Y10T 428/2457
See application file for complete search history.

(56) References Cited

FOREIGN PATENT DOCUMENTS

| | | |
|---|---|---|
| JP | 11-320803 A | 11/1999 |
| JP | 2003-340957 A | 12/2003 |
| JP | 2010-174577 A | 8/2010 |

OTHER PUBLICATIONS

Machine translation of applicant cited JP 2010-174577 (Year: 2010).*

* cited by examiner

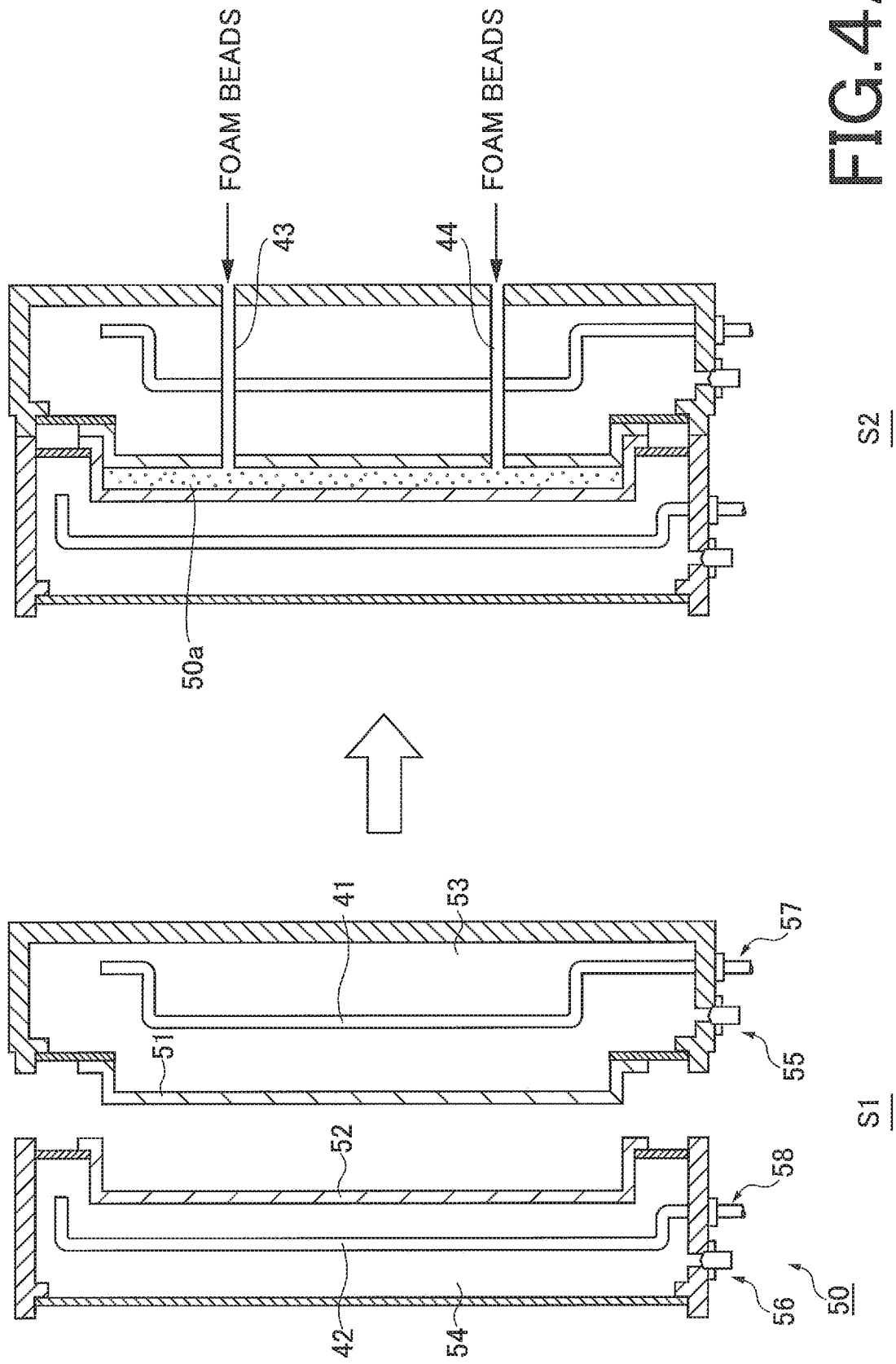

CROSS-SECTIONAL SURFACE B-B IN INTERIOR MATERIAL 10

FOAM STRUCTURAL MATERIAL, RESIN PANEL, AND METHOD FOR MANUFACTURING A RESIN PANEL

CROSS-REFERENCE TO RELATED APPLICATION

This application is a continuation application of U.S. Ser. No. 14/651,169, filed Jun. 10, 2015, which is a National Stage application of PCT/JP2013/081431, filed Nov. 21, 2013. National Stage application of PCT/JP2013/081431 claims the benefit of priority of the prior Japanese Patent Application No. 2012-288328, filed on Dec. 28, 2012. The entire contents of U.S. Ser. No. 14/651,169 and Japanese Patent Application No. 2012-288328 are incorporated herein by reference.

FIELD

The present invention relates to a foam structural material, and a resin panel including the foam structural material covered with skin material sheets, and also relates to an art for manufacturing the foam structural material and the resin panel.

BACKGROUND

Conventionally, resin panels have been used in various applications such as transport machines such as automobiles and aircraft, building materials, housings for electrical devices, sports, leisure and the like. A resin panel includes a core material covered with skin material sheets. There are a resin panel including a core material whose only one surface is covered with a skin material sheet, and a resin panel including a core material whose both surfaces are covered with skin material sheets. The resin panel including a core material whose only one surface is covered with a skin material sheet is used in the case in which the other surface is not visually recognized by a user for use in building materials for example, and thus it is unnecessary to cover the other surface of the core material with a skin material sheet. A resin panel including a core material whose both surfaces are covered with skin material sheets is also referred to as a sandwich panel. The resin panel has two skin material sheets, and a core material that intervenes between the two skin material sheets. That is, a fundamental form of a resin panel is a stacked structure of a skin material sheet, a core material and a skin material sheet.

Conventionally, a structure is known including a resin foam body, as a core material, into which a metal reinforcing material is inserted. For example, Japanese Laid-open Patent Publication No. 2010-174577 discloses a resin panel including, in a hollow part of a hollow double-walled structure, an interior material that unites a core material and a reinforcing material by fitting the reinforcing material with the core material of thermoplastic resin. Before fitted, the core material is molded into a shape that is approximately the same as that of the space in the hollow part. According to the Publication, with the resin panel, the interior material may be suitably positioned, and rattling or deformation of shrinkage due to molding may be prevented.

SUMMARY OF THE INVENTION

A conventional interior material (foam structural material) for a resin panel including a core material and a reinforcing material that are united is manufactured in the way that a reinforcing material is fitted between two foam bodies as core materials. Here, these two foam bodies are basically formed using a common molding apparatus. However, even in such case, the two foam bodies may be formed in different lots or under different circumstances (for example, operational conditions of the apparatus, or internal/peripheral circumstantial conditions of the apparatus), and thus, volume variations in respective foam bodies may be different after taken out of the molding apparatus. If the volume variations in respective foam bodies are different, appearance of a resin panel may become poor. This happens because, when the two foam bodies are subsequently fitted with the reinforcing material after formed, a gap between one of the foam bodies and the reinforcing material may become larger than a gap between the other of the foam bodies and the reinforcing material. As an example of the case when appearance of a resin panel becomes poor, a surface of the resin panel is not flat over the entire area and partially bumps.

The present invention has been made in view of the above-mentioned points. Purposes of the invention are: to improve accuracy in fitting a core material with a reinforcing material in manufacturing a foam structural material including a core material and a reinforcing material that are united, and to provide a foam structural material and a resin panel with improved accuracy.

A first aspect of the present invention is a foam structural material.

The foam structural material includes: a first core material a first core material having a first portion of a linear groove part being formed along an edge of the first core material, and a reinforcing material having a first side fitted to the first portion of the linear groove part. The first portion of the linear groove part includes a first engagement plane, the first engagement plane being engaged with the reinforcing material and having one or a plurality of projections formed thereon.

A second aspect of the present invention is a second core material with a second portion of a linear groove part being formed along an edge of the second core material. The reinforcing material has a second side fitted to the second portion of the linear groove part, the reinforcing material securing the first core material to the second core material. The reinforcing material has an H-shaped cross-sectional surface, and the second portion of the linear groove part includes a second engagement plane, the second engagement plane being engaged with the reinforcing material and having one or a plurality of projections formed thereon.

A third aspect of the present invention includes stoppers that are formed at opposite ends of the first portion of the linear groove part and the second portion of the linear groove part for preventing the reinforcing material from separating.

BRIEF DESCRIPTION OF THE DRAWING

FIG. 4A is a drawing for explaining a step of molding the foam body illustrated in FIG. 3.

DETAILED DESCRIPTION OF THE EMBODIMENTS

Figure 1:
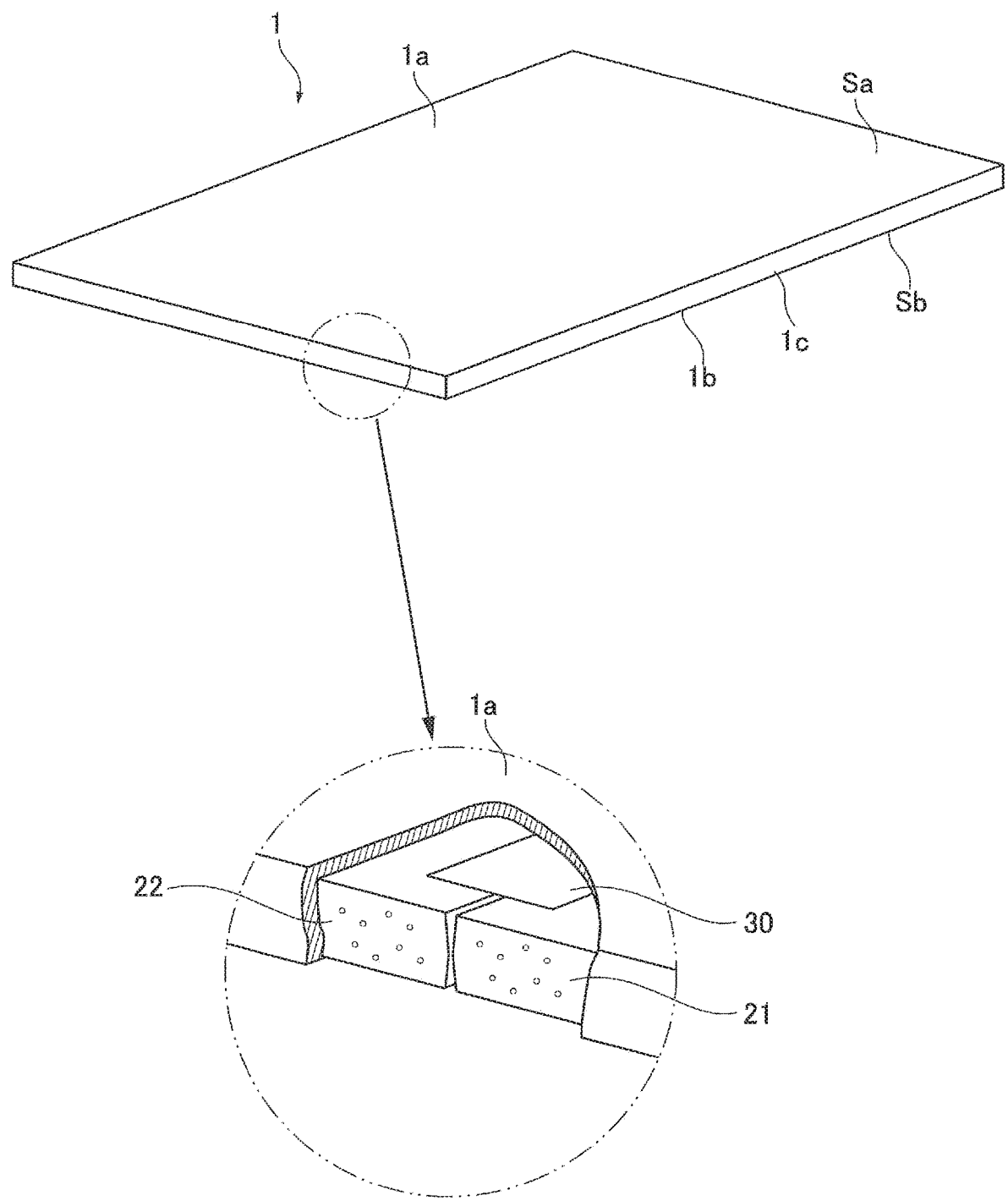
FIG. 1 is a perspective view of a resin panel of a present embodiment, and an enlarged breakaway view of a part thereof.

An embodiment of a resin panel, an interior material for a resin panel, and methods for manufacturing these according to the present invention will be explained below.
(1) Resin Panel, and Interior Material for Resin Panel As illustrated in FIG. 1, the outer shape of a resin panel 1 according to a present embodiment includes a top surface 1a, a rear surface 1b, and a side wall surface 1c that intervenes between the top surface 1a and the rear surface 1b. The top surface 1a, the rear surface 1b, and the side wall surface 1c are constituted by resin sheets SA and SB of thermoplastic resin, and include an interior material 10. Namely, the resin panel 1 has a sandwich structure in which the interior material 10 is sandwiched by the resin sheets SA and SB of thermoplastic resin. The interior material 10 is an example of a foam structural material.

In the resin panel 1 of the present embodiment, the resin material for the resin sheets SA and SB, which become skin material sheets, is not limited; however, it is preferable that the resin sheets be formed of a non-foam resin so as to ensure stiffness of the resin panel 1. For example, with consideration for moldability, material of the resin sheets SA and SB may be a mixture of polypropylene (PP) as a main material with polystyrene (PS) and styrene-ethylene-butylene-styrene block copolymer resin (SEBS).

Figure 2:
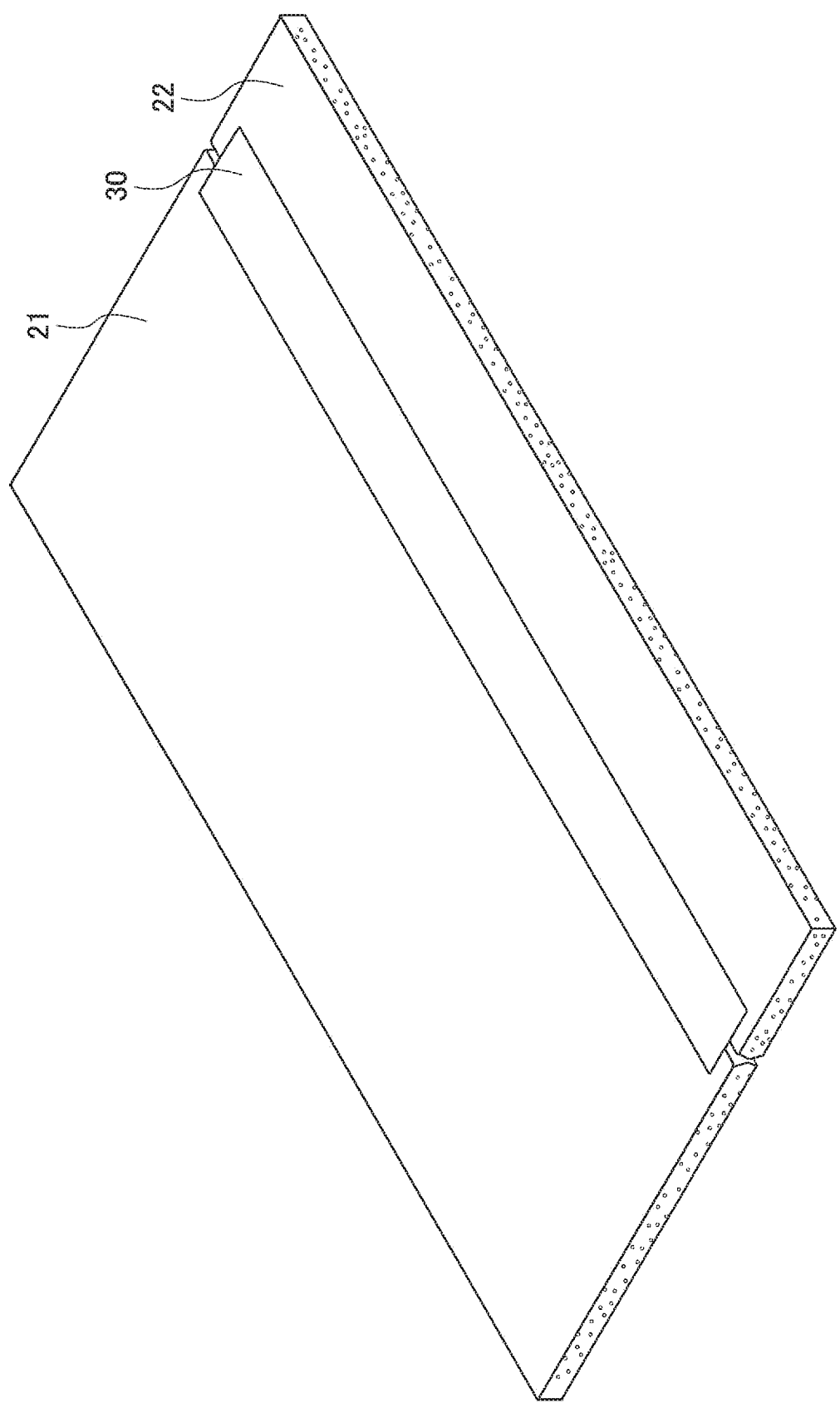
FIG. 2 is a perspective view of an interior material for a resin panel of a present embodiment.

As illustrated in FIG. 2, the interior material 10 is a composite structured body in which core materials 21, 22 and a reinforcing material 30 are united by respectively fitting the core materials 21, 22 as resin foam bodies with one side and the other side of the reinforcing material 30. The reinforcing material 30 is a long element that is almost as long as each side the core materials 21, 22. The reinforcing material 30 of the present embodiment is an element having an H-shaped cross-sectional shape (so-called an H-shaped extrusion reinforcer), but the shape of the reinforcing material 30 is not limited to this. The cross-sectional shape of the reinforcing material 30 may be a C-shape, a U-shaped, a square pipe shape or a circular pipe shape or the like. The cross-sectional shape of the reinforcing material 30 may be a suitable shape as long as it is a shape such that the reinforcing material 30 is fitted and united with the core materials 21, 22. The reinforcing material 30 is preferably made of metal such as aluminum, or made of hard plastic.

The thickness of each of the core materials 21, 22 is not limited to a specific value, but may be suitably determined in accordance with a target thickness of the resin panel 1, and thickness of the resin sheet for ensuring target stiffness of the resin panel 1.

In the resin panel 1 of the present embodiment, the core materials 21, 22 are molded by using thermoplastic resin for example. The resin material for the core materials 21, 22 may include, but not limited to, for example, any of polyolefins such as polypropylene and polyethylene, and acrylic derivatives such as polyamides, polystyrenes and polyvinyl chloride, or a mixture of two or more kinds. Since a ratio of volume of the core materials 21, 22 to volume of the resin panel 1 is large, the core materials 21, 22 may be preferably made of foam resin foamed by using a foaming agent for the purpose of weight reduction. Here, expansion ratio of the foam resin is not especially limited.

In the resin panel 1 of the present embodiment, examples of the foaming agent used in the core materials 21, 22 include known physical foaming agents, chemical foaming agents and mixtures thereof. For example, as the physical foaming agents, inorganic-based physical foaming agents such as air, carbonic acid gas and nitrogen gas, and organic-based physical foaming agents such as butane, pentane, hexane, dichloromethane and dichloroethane can be applied. Furthermore, as the chemical foaming agents, for example, organic foaming agents such as azodicarbonamide (ADCA), N,N'-dinitrosopentamethylenetetramine, 4,4'-oxybis(benzenesulfonylhydrazide), diphenylsulfone-3,3'-disulfonylhydrazide, p-toluenesulfonylsemicarbazide, trihydrazinotriazine or azobisisobutyronitrile; mixtures of a polycarboxylic acid such as citric acid, oxalic acid, fumaric acid, phthalic acid, malic acid, tartaric acid, cyclohexane-1,2-dicarboxylic acid, camphor acid, ethylenediamine tetraacetic acid, triethylenetetramine hexaacetic acid or nitriloacid with an inorganic carbonic acid compound such as sodium hydrogen carbonate, sodium aluminum hydrogen carbonate, potassium hydrogen carbonate, ammonium hydrogen carbonate or ammonium carbonate; and salts of polycarboxylic acids such as sodium dihydrogen citrate and potassium oxalate are exemplified as the inorganic foaming agents.

The resin sheets SA and SB and core materials 21, 22 may be molded by using a resin material mixed with a glass filler for the purpose of increasing stiffness and strength.

As the glass filler, glass fibers, glass fiber fabrics such as glass cloths and glass nonwoven fabrics, glass beads, glass flakes, glass powders, milled glasses and the like may be applied for example. The kinds of the glasses include E-glass, C-glass, A-glass, S-glass, D-glass, NE-glass, T-glass, quartz, low-dielectric constant glass, high-dielectric constant glass and the like.

Fillers other than the glass filler may be applied. Such filler may be inorganic fillers such as talc, calcium carbonate, Wollastonite and magnesium-based materials, carbon fibers and the like for improving stiffness may be incorporated.

(2) Interior Material 10 and Manufacturing Method Therefor

Subsequently, the interior material 10 and the manufacturing method therefor of the present embodiment will be explained with reference to FIG. 3 to FIG. 10.

Figure 3:
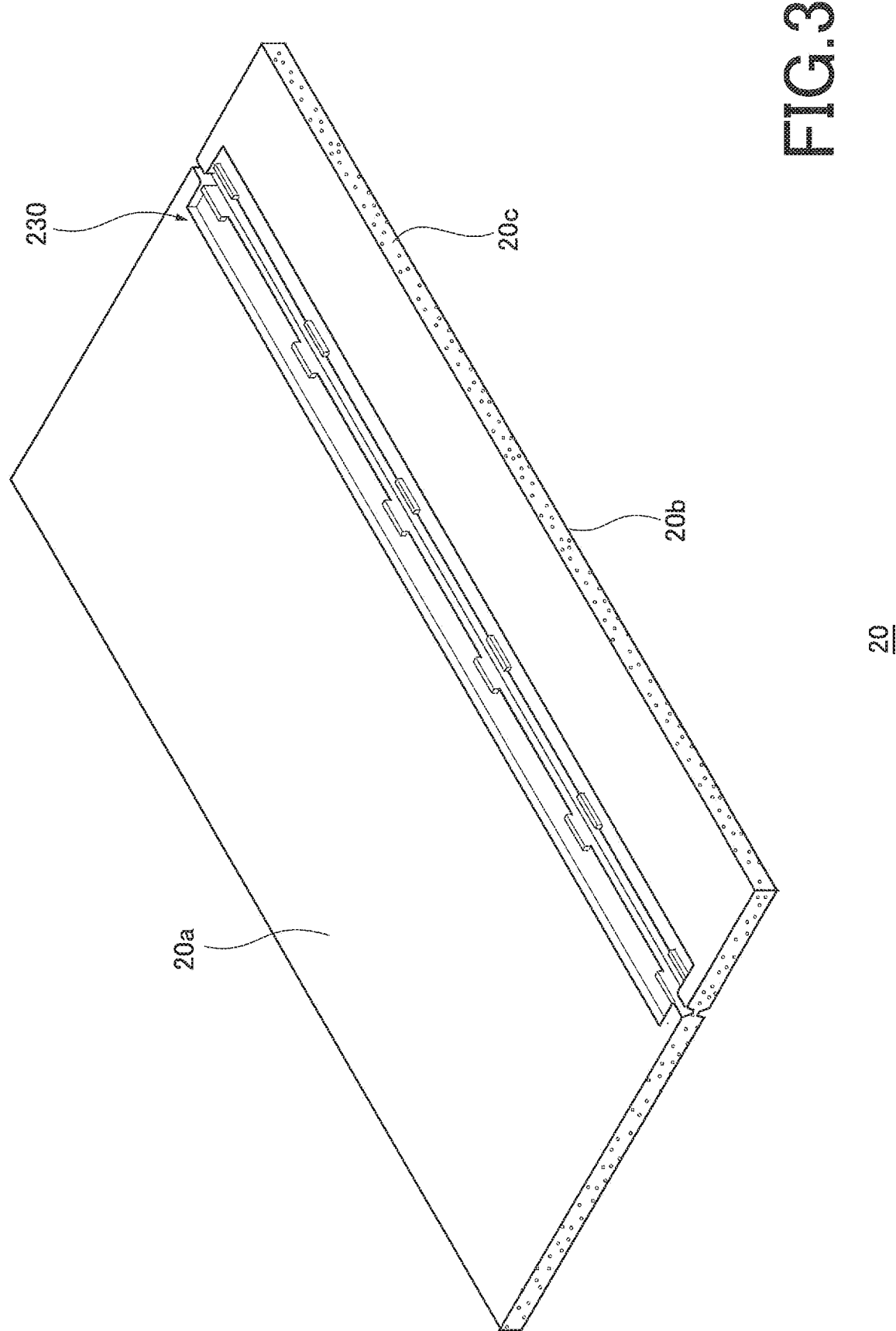
FIG. 3 is a perspective view of a foam body as a core material of an interior material for a resin panel of a present embodiment.
Figure 4B:
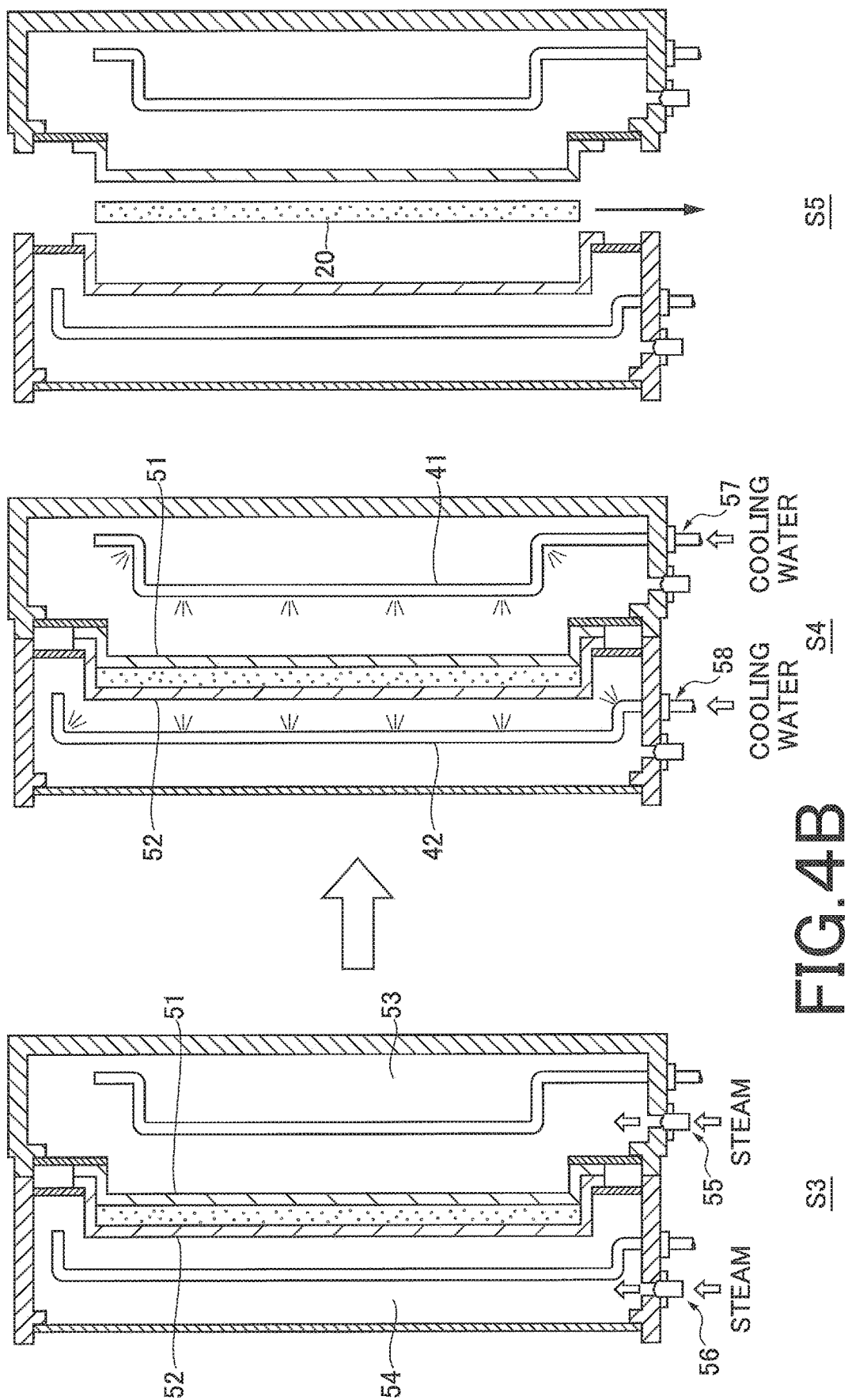
FIG. 4B is a drawing for explaining a step of molding the foam body illustrated in FIG. 3.
Figure 5:
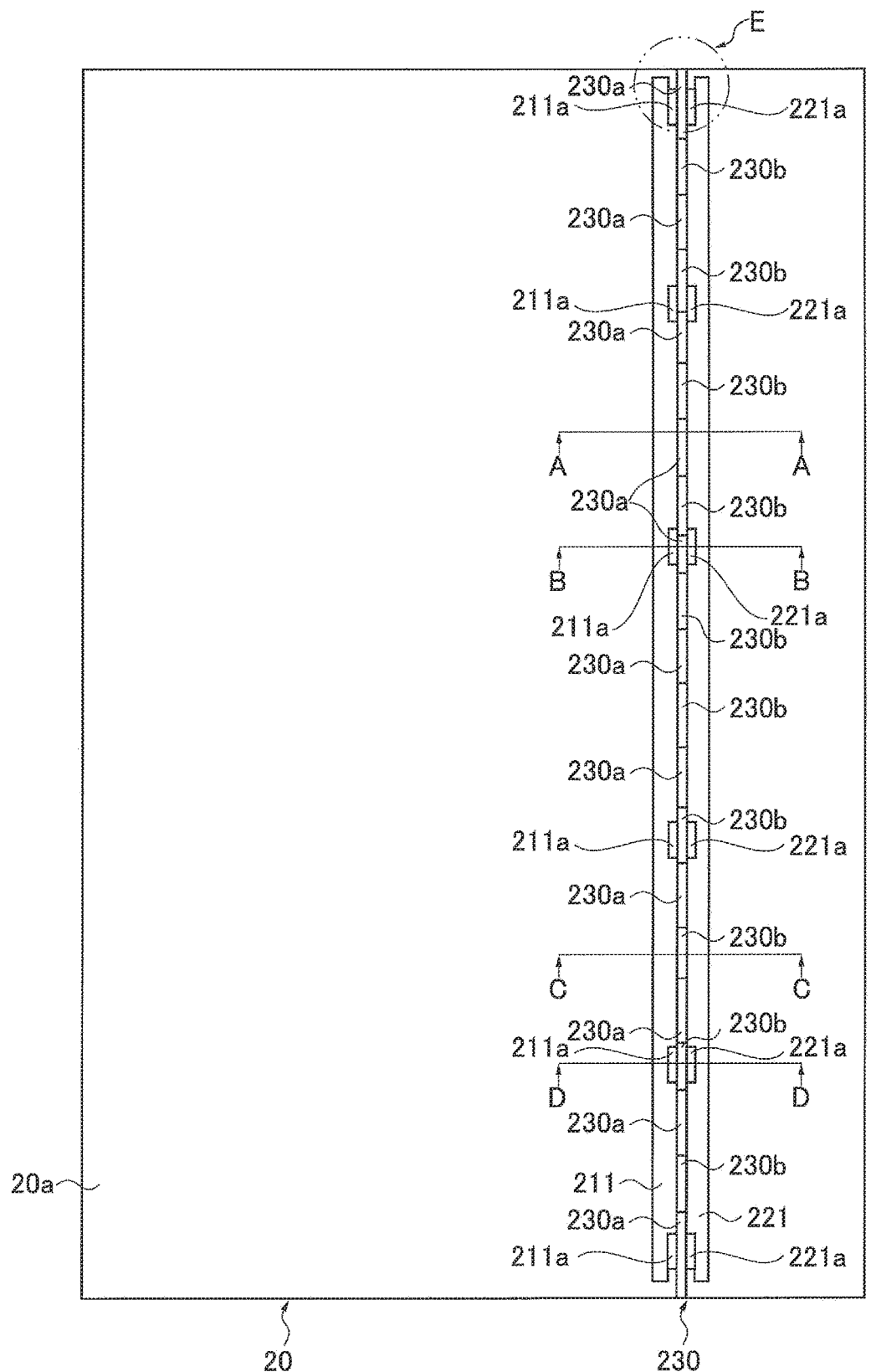
FIG. 5 is a plan view of a foam body as a core material of an interior material for a resin panel of a present embodiment.
Figure 6:
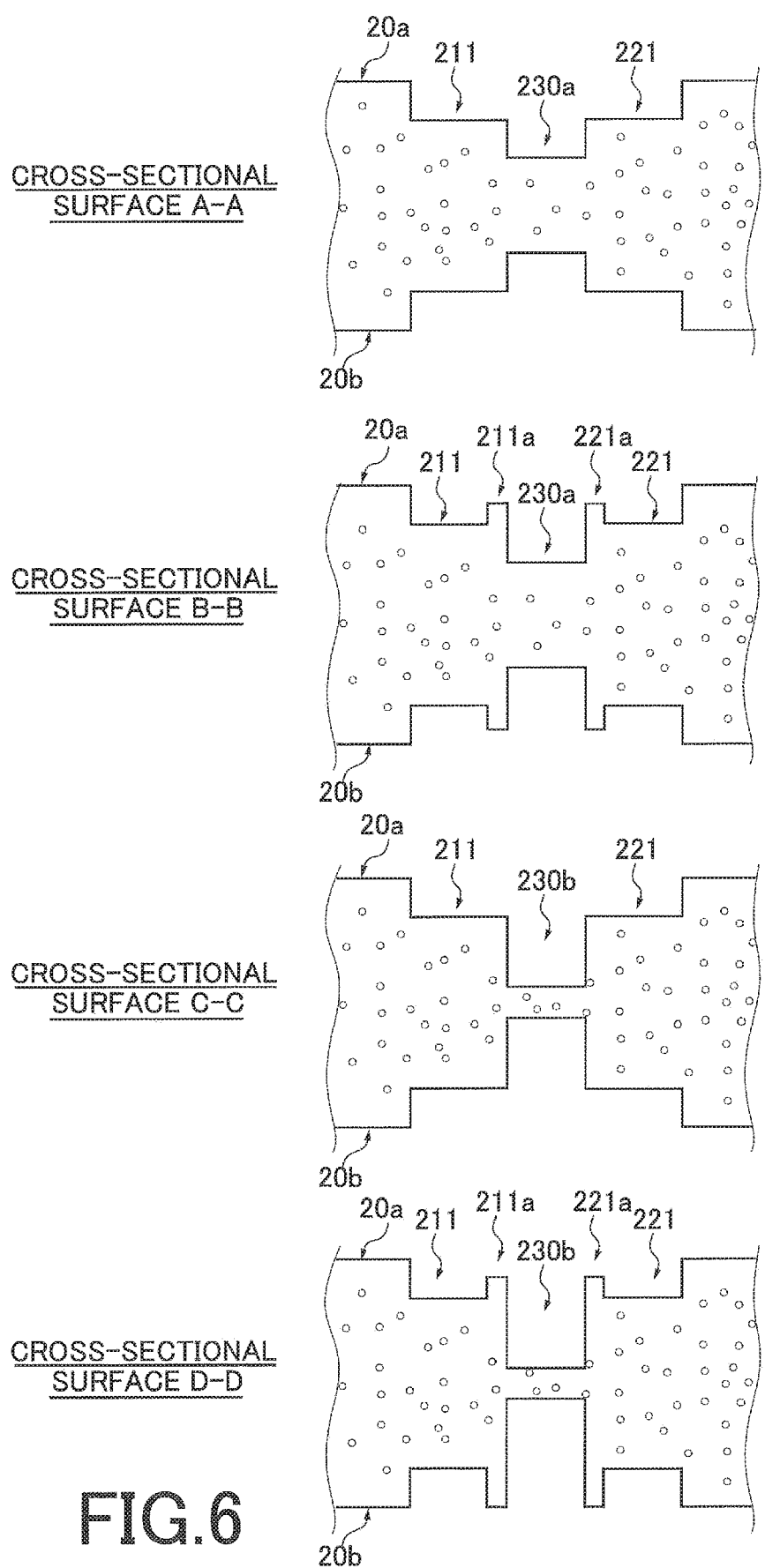
FIG. 6 illustrates cross-sectional views of A-A, B-B, C-C and D-D illustrated in FIG. 5.
Figure 7:
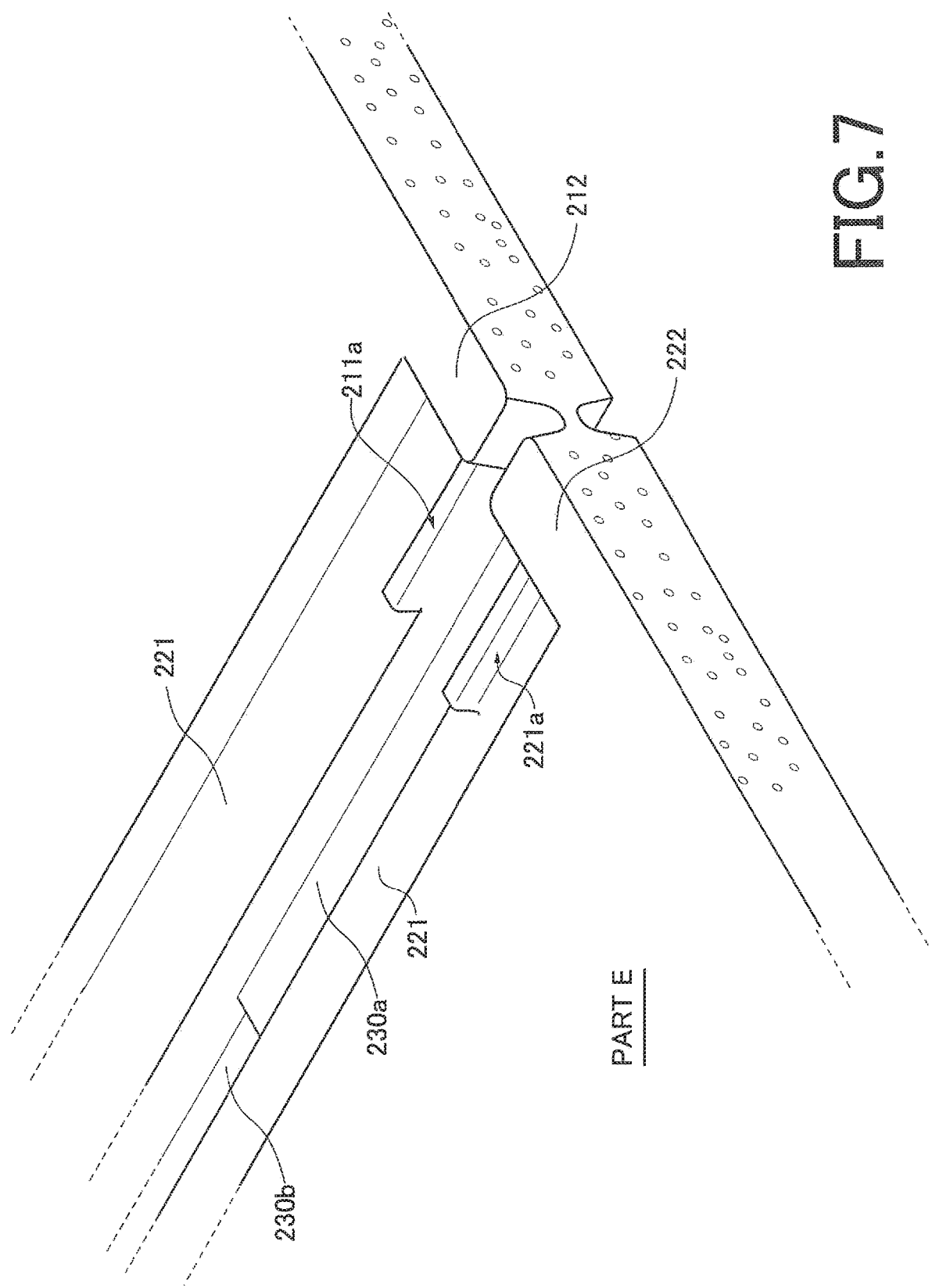
FIG. 7 is an enlarged perspective view of the part E illustrated in FIG. 5.
Figure 8:
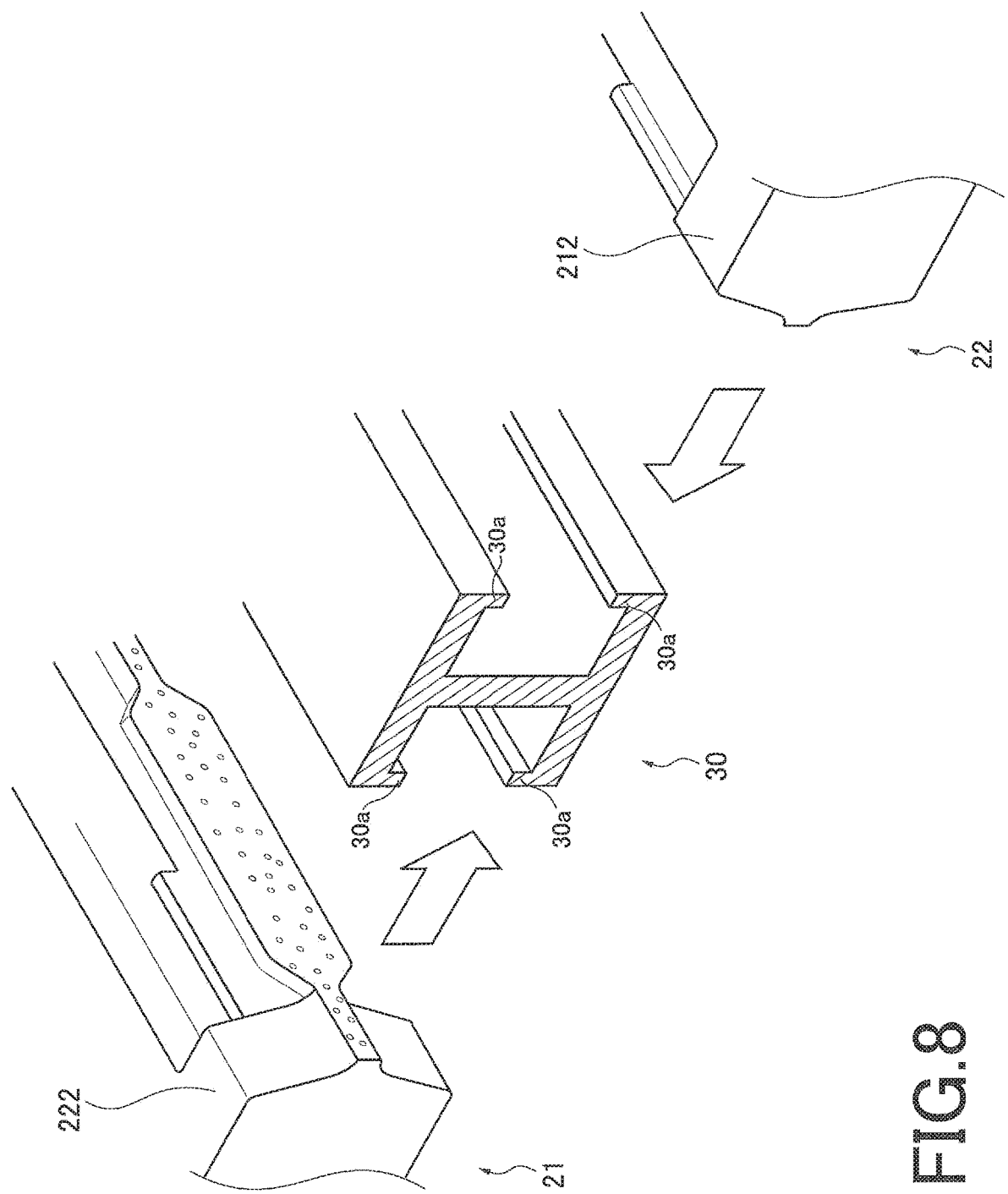
FIG. 8 is a drawing illustrating a step of assembling an interior material for a resin panel of a present embodiment.
Figure 10:
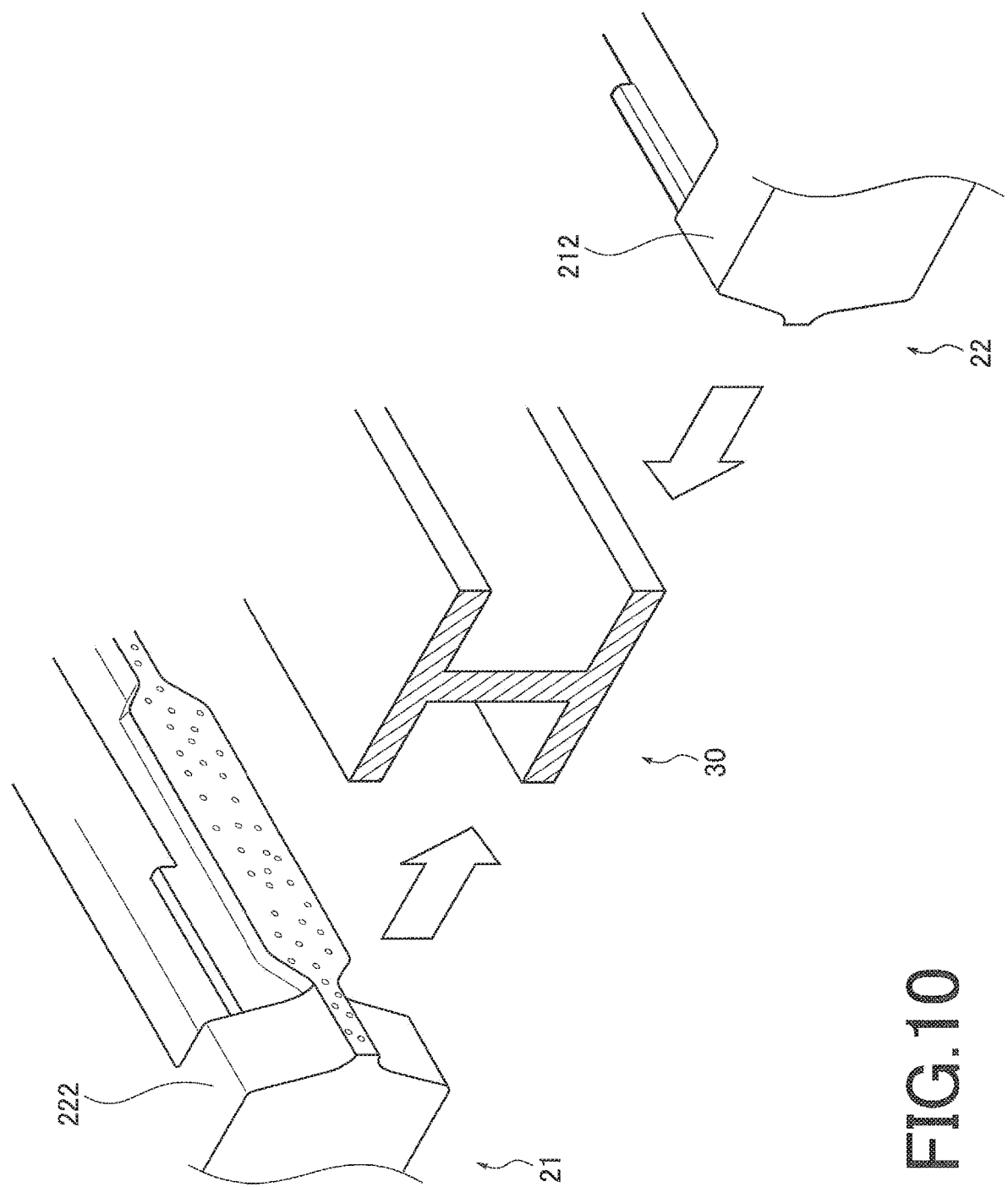
FIG. 10 is a cross-sectional view of an interior material for a resin panel of a present embodiment.

FIG. 3 is a perspective view of a foam body 20 that will become the core materials 21, 22 of the interior material 10 of the present embodiment. FIG. 4A and FIG. 4B are drawings for explaining the steps of molding the foam body 20 illustrated in FIG. 3 in sequence. FIG. 5 is a plane drawing of the foam body 20 that will become the core materials 21, 22 of the interior material 10 of the present embodiment. FIG. 6 illustrates the cross-sectional surfaces of A-A, B-B, C-C and D-D illustrated in FIG. 5. FIG. 7 is an enlarged perspective view of the part E illustrated in FIG. 5. FIG. 8 is a drawing illustrating the steps of assembling the interior material 10 of the present embodiment. FIG. 10 is a cross-sectional view at the position corresponding to B-B of FIG. 5 of the interior material 10 of the present embodiment.

(2-1) Foam Body that Forms Bases for Core Materials

The core materials 21, 22 of the present embodiment are prepared by splitting the foam body 20 that is formed as a united object. As illustrated in FIG. 3, the outer shape of the foam body 20 includes a top surface 20a and a rear surface 20b, and a side wall surface 20c that intervenes between the top surface 20a and the rear surface 20b.

As illustrated in FIG. 3, a linear groove part 230 is formed from one side to the other side on the top surface 20a of the foam body 20. The groove part 230 is also formed on the rear surface 20b of the foam body 20 in a similar manner to the top surface 20a. The groove part 230 is provided for splitting the foam body 20 and fitting the reinforcing material 30 after the splitting. The groove part 230 will be explained later in detail.

(2-2) Molding of Foam Body that Forms a Basis for Core Materials

The foam body 20 is molded by using a molding apparatus 50 illustrated in FIG. 4A and FIG. 4B with bead foaming technology. As illustrated in S1 of FIG. 4A, molds 51, 52 that are disposed so as to face each other are provided to the molding apparatus 50. The molds 51, 52 respectively constitute parts of empty chambers 53 and 54. Cooling tubes 41 and 42 are arranged in the empty chambers 53 and 54 respectively.

When the molds 51, 52 are closed from the state illustrated in S1 of FIG. 4A, a cavity 50a, which is a closed space between the molds 51, 52, is formed as illustrated in S2 of FIG. 4A. Foam beads are filled through feeders 43 and 44 in the state in which the molds 51, 52 are closed. The amount of the foam beads to be filled is, for example, from 105% to 110% of the volume of the cavity 50a. Subsequently, as illustrated in S3 of FIG. 4B, steam (for example, vapor pressure: 3.0 kgf/cm$^2$ to 3.5 kgf/cm$^2$) is injected from steam injection inlets 55 and 56 into the empty chambers 53 and 54 respectively, for example, for 10 to 30 seconds. The steam enters air bubbles and individual airspaces in the foam beads through fine pores that have been formed in the molds, and allows fusion bonding of the beads. Subsequently, As illustrated in S4 of FIG. 4B, cooling water is injected from cooling water injection inlets 57, 58, and sprayed onto the molds 51, 52, thereby cooling the molds 51, 52 and the foam body 20 to solidify the foam body 20. Subsequently, as illustrated in S5 of FIG. 4B, the molds are opened, and the foam body 20 is removed. The foam body 20 is then cured by being exposed a room at 50° C. to 70° C. for 12 hours to 24 hours for example. Thereby, curing is promoted, and shrinkage holes and deformation are prevented.

(2-3) Example of Detailed Shape of Foam Body that is a Basis of Core Materials

Next, the detailed shape of the groove part 230 of the foam body 20 will be explained with reference to FIGS. 5 to 7. Only the groove part 230 on the side of the top surface 20a will be explained hereinafter; however, the groove part 230 on the side of the rear surface 20b has an identical shape. In this present embodiment, when a plane is supposed that passes the center of the groove part 230 and is orthogonal to the top surface 20a, the groove part 230 has asymmetric structure across that plane.

In the groove part 230, engagement planes 211, 221 are formed with a predetermined level difference from the top surface 20a of the foam body 20. As illustrated in FIG. 5, the engagement planes 211, 221 are formed on the entire area of the groove part 230 from one end to another end of the top surface 20a of the foam body 20. The engagement planes 211, 221 are disposed for engaging a reinforcing material 30 having an H-shaped cross-sectional shape (H-shaped extrusion reinforcer), thereby uniting and fitting the core materials 21, 22 with the reinforcing material 30. The level difference between top surface 20a and the engagement planes 211, 221 may be suitably preset as long as the top surface 20a and the upper plane of the reinforcing material 30 are on approximately the same plane in a state in which the core materials 21, 22 are united and fitted with the reinforcing material 30. Furthermore, each of the widths of the engagement planes 211, 221 may be determined such that the reinforcing material 30 are able to be engaged with the engagement planes 211, 221.

As illustrated in FIG. 5, projections 211a, 221a are respectively formed on six positions along the direction to which the engagement planes 211, 221 extend; however, the number of the projections 211a, 221a is merely an example, and is not limited to the number shown in FIG. 5. The projections 211a, 221a are disposed for the purpose of increasing pressure that is generated between the reinforcing material 30 and the engagement planes 211, 221 when the reinforcing material 30 having an H-shaped cross-sectional shape (H-shaped extrusion reinforcer) is engaged, and thereby increasing the fitting force of the core materials 21, 22 to the reinforcing material 30. That is, with the projections 211a, 221a provided, detachment of the core materials 21, 22 from the reinforcing material 30 hardly happens in the direction that is orthogonal to the direction to which the engagement planes 211, 221 extend, after the core materials 21, 22 are fitted with the reinforcing material 30.

It should be noted that, although FIGS. 5 and 6 illustrate the case in which the projections 211a, 221a are disposed on opposed portions on all positions; however, the present invention is not limited to this case. The projections 211a, 221a may be disposed on the positions that are not related each other on the engagement plane 211 and the engagement plane 221.

The heights of the projections 211a, 221a, the length along the direction to which the engagement planes 211, 221 extend, and the numbers of the respective projections are suitably preset, in consideration with workability when the core materials 21, 22 and the reinforcing material 30 are assembled (i.e., force in fitting) and with detachment force of the core materials 21, 22 after the core materials 21, 22 have been fitted with the reinforcing material 30.

In the example illustrated in FIGS. 5 and 6, the projections 211a, 221a are respectively formed on the ends of the engagement planes 211, 221, but the present invention is not limited to this example. The projections 211a, 221a may not be respectively formed on the ends of the engagement planes 211, 221 so long as the projections 211a, 221a are disposed on a area where the reinforcing material 30 is engaged with the engagement planes 211, 221, thereby increasing pressure that is generated between the reinforcing material 30 and the engagement planes 211, 221.

As is clearly seen in FIG. 6, it is preferable that shallow grooves 230a each having a relatively shallow depth, and deep grooves 230b each having a relatively deep depth are formed as grooves for splitting the foam body 20 between the engagement planes 211, 221. In the example illustrated in FIG. 5 and FIG. 6, shallow grooves 230a at eleven positions and deep grooves 230b at ten positions are provided. The reason why the shallow grooves 230a and the deep grooves 230b are provided as the grooves for splitting the foam body 20 is as follows. Specifically, if only deep grooves were formed, the force for splitting the foam body 20 in the subsequent step would be less, and thus the workability would be improved; however, the paths of the cavities of the mold at the positions corresponding to the deep grooves would be narrower in the step of molding the foam body 20, and thus it would be more difficult to fill the foam beads into the entire space of the cavities from the feeder. On the other hand, if only shallow grooves were formed, it would be easier to fill the foam beads from the feeder in the step of molding the foam body 20; however, the force for splitting the foam body 20 in the subsequent step would increase, and the workability would be deteriorated. Therefore, from the viewpoint of achieving both good moldability and good workability, both the shallow grooves 230a and the deep grooves 230b are provided.

It should be noted that, as illustrated in FIG. 5, plural shallow grooves 230a and plural deep grooves 230b may be provided preferably in an alternate manner. This is because the accuracy of the split portion of the foam body 20 is improved since the positions of the plural shallow grooves are dispersed along the direction to which the engagement planes 211, 221 extend, while both better moldability and better workability are achieved.

As illustrated in FIG. 7, it is preferable that stoppers 212, 222 are formed on the part E of FIG. 5, i.e., one end of the groove part 230. The stoppers 212, 222 are provided to prevent the reinforcing material 30 from dropping off of after the interior material 10 is assembled.

In addition, although planes of the stoppers 212, 222 are the same as the plane of the top surface 20a in the example illustrated in FIG. 7; however, the stoppers are not limited to this arrangement. The plane of the stoppers 212, 222 are not necessarily the same as the plane of the top surface 20a. It is sufficient that the stoppers 212, 222 projects toward the top surface 20a so that the place of the stoppers 212, 222 are over the engagement planes 211, 221, which the reinforcing material 30 is engaged with. This prevents the reinforcing material 30 from moving along the longitudinal direction and dropping off.

(2-4) Splitting of Foam Body, and Assembling of Interior Material

Next, the steps after the molding of the foam body 20 will be explained.

Figure 9:
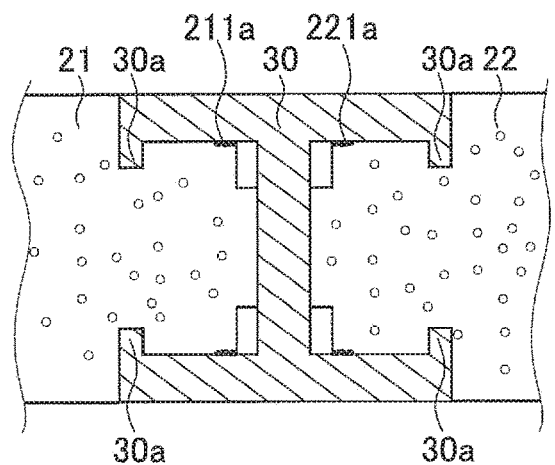
FIG. 9 is a drawing illustrating a step in the case in which another reinforcing material is used in FIG. 8.

When the foam body 20 has been molded, the foam body 20 is split at the shallow grooves 230a and the deep grooves 230b of the groove part 230, thereby splitting into the core materials 21, 22 as a first core material and a second core material. Subsequently, as illustrated in FIG. 8, the core materials 21, 22 are respectively fitted from one side and the other side of the reinforcing material 30 to assemble an interior material 10 in which the core materials 21, 22 the reinforcing material 30 are united. As illustrated in FIG. 9, at the positions where the projections 211a, 221a are formed in the interior material 10, pressure of the core materials 21, 22 against the reinforcing material 30 increases. Further, even in the case in which the core materials 21, 22 respectively move to the right direction or the left direction in the drawing, the core materials 21, 22 are not detached from the reinforcing material 30, since the projections 30a of the reinforcing material 30 abut to the projections 211a, 221a of the core materials 21, 22.

It should be noted that, as illustrated in FIG. 10, a reinforcing material 30 having no projections 30a may also be used. Even with such reinforcing material 30, the pressure that is produced between the reinforcing material 30 and the core materials 21, 22 at the positions of the projections 211a, 221a, increases. Thus, the core materials 21, 22 are not likely to be detached in the right direction or the left direction in each drawing.

The foam body 20 that forms the bases for the core materials 21, 22 is integrally molded by using the same molding apparatus in the present embodiment. Thereby, even if there are volume variations for the foam body 20 during the molding due to operational conditions of the apparatus, or internal/peripheral circumstantial conditions of the apparatus for example, there are almost no differences in shape between the core material 21 and the core material 22, which are obtained by splitting the foam body 20. So, problems due to inconsistency of the shapes of the core materials are not likely to occur. Such inconsistency may be that, when the core materials 21, 22 are fitted with the reinforcing material 30, a gap between one of the core materials 21, 22 and the reinforcing material 30 is larger than a gap between the other of the core materials 21, 22 and the reinforcing material 30. Therefore, when the resin panel 1 has been prepared by the step of molding a resin panel, which will be mentioned below, deterioration of appearance of the resin panel 1, for example, deterioration of the appearance that the plane of the resin panel 1 is not flat over the entire area and partially includes projection(s), are not likely to occur.

(3) Method for Molding Resin Panel

Subsequently, the apparatus and method for molding the resin panel 1 of the present embodiment by using molds will be explained with reference to FIGS. 1 to 17.

Firstly, the apparatus for molding the resin panel 1 of the present embodiment will be explained.

Figure 11:
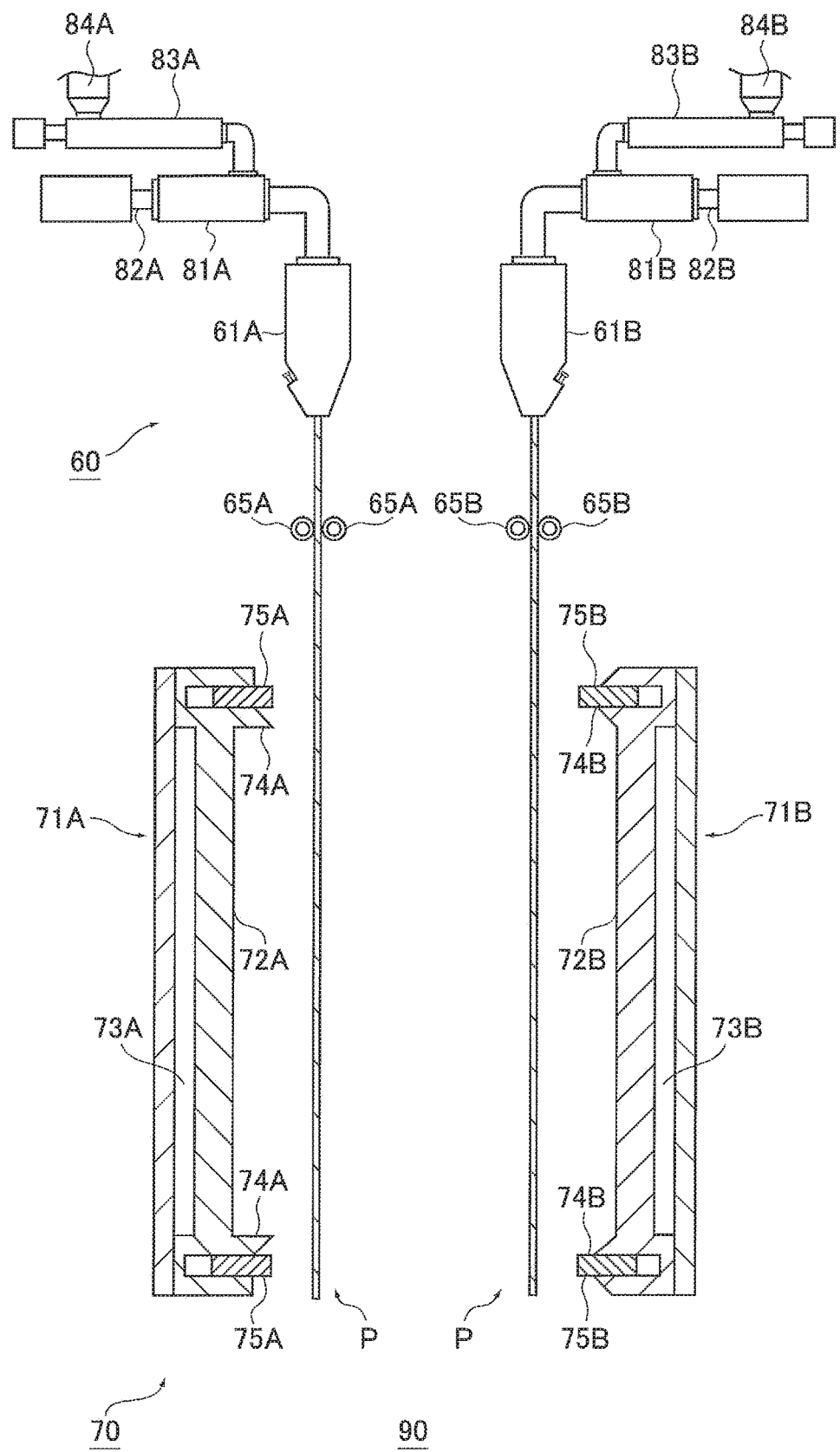
FIG. 11 is a drawing illustrating the entire arrangement of a molding apparatus of a resin panel of a present embodiment.

As illustrated in FIG. 11, the molding apparatus 90 of the present embodiment has an extruder 60, and a mold clamping apparatus 70 that is disposed below the extruder 60. Resin sheets P in a molten state which have been extruded from the extruder 60 are fed to the mold clamping apparatus 70, and the resin sheets P in a molten state are molded in the mold clamping apparatus 70. In FIG. 1I, only the mold clamping apparatus 70 and the resin sheets P in a molten state are illustrated by a cross-sectional drawing.

The extruder 60 includes T-dies 61A, 61B, accumulators 81A, 81B, plungers 82A, 82B, extruders 83A, 83B, and resin feed hoppers 84A, 84B. In the extruder 60, the resin raw material is melt-plasticized by using an extruder, and this molten resin is extruded from the T-dies 61A, 61B out of the dies. In the extruder 60, extrusion ability of the extruders 83A, 83B may be suitably selected depending on the size of the resin panel 1. The extrusion ability may be preferably 50 kg/h or more in view of shortening molding cycle of the resin panel 1.

Extrusion velocity of the resin sheet in the extruder 60 is preset by the T-dies 61A, 61B and the accumulators 81A, 81B. Furthermore, from the viewpoint of prevention of drawdown, it is preferable to complete the extrusion of the resin sheets at the T-dies 61A, 61B within 40 seconds, and it is further preferable to complete the extrusion within 30 seconds. Therefore, it is deemed that the molten resin material stored in the accumulators 81A, 81B is extruded from the T-dies 61A, 61B at 50 kg/h or more, preferably 60 kg/h or more per 1 $cm^2$. At this time, by changing widths of slits of the die tips of the T-dies 61A, 61B depending on the extrusion velocity of the resin sheet, effect of drawdown can further be suppressed. Specifically, the interval of the slits of the T-dies 61A, 61B may be gradually extended from the initiation of extrusion, and may be made maximum at the time of completion of the extrusion. Thereby, thickness variation due to the own weight of each resin sheet is suppressed, and thus the thickness of each resin sheet may be identical over a wide range in the vertical direction. This enables even thickness of each resin sheet at the time point when a pair of split molds, which will be mentioned below, is moved from an open position to a close position.

Referring again to FIG. 11, the mold clamping apparatus 70 has a pair of split molds 71A, 71B, which are moved between the open position and the close position in the direction that is approximately orthogonal to the feeding direction of the resin sheets P in a molten state. The pair of the split molds 71A, 71B is disposed such that the respectively corresponding forming surfaces 72A, 72B are opposed. Concave portions and/or convex portions may be disposed on the surfaces of the forming surfaces 72A, 72B depending on the approximate outer shape of the resin panel 1.

In the respective split molds of the pair of split molds 71A, 71B, pinch off portions 74A, 74B are formed in the vicinities of the upper and lower ends of the respectively corresponding forming surfaces 72A, 72B. These pinch off portions 74A, 74B are respectively formed in ring shapes around the forming surfaces 72A, 72B, and respectively project toward the opposing split molds 71B and 71A. Thereby, when the pair of split molds 71A, 71B is subjected to mold clamping, tip portions of the respective pinch off portions 74A, 74B abut, and a parting line PL is formed on the peripheral edges of the resin sheets P in a molten state.

In the pair of split molds 71A, 71B, sliding parts 75A, 75B are disposed in a manner that enables projection from the forming surfaces 72A, 72B at the circumferences of the forming surfaces 72A, 72B. The sliding parts 75A, 75B are disposed such that: end planes of the sliding parts 75A, 75B comes into contact with the resin sheets P when the sliding parts 75A, 75B projects from the forming surfaces 72A, 72B, and closed spaces (cavities) are formed between the resin sheets P and the forming surfaces 72A, 72B of the pair of split molds 71A, 71B.

Vacuum chambers 73A, 73B are built in the pair of split molds 71A, 71B. The vacuum chambers 73A, 73B are connected to a vacuum pump and a vacuum tank (both of these are not illustrated). Passages (not illustrated) for vacuum suction from the cavities are disposed between the vacuum chambers 73A, 73B and the forming surfaces 72A, 72B.

The pair of split molds 71A, 71B is driven by a mold driving apparatus (not illustrated) so that the split molds 71A, 71B can move between the open position and the close position. In the open position, two continuous resin sheets P in a molten state can be disposed at an interval with each other between the pair of split molds 71A, 71B. The two resin sheets P are molded to become resin sheets SA and SB in the resin panel 1. In the close position, the pinch off portions 74A, 74B of the pair of split molds 71A, 71B abut, and thereby, cavities are formed in the two resin split molds 71A, 71B in a molten state during the movement from the open position to the close position. In addition, each of the pair of split molds 71A, 71B is driven so as to move toward the position of the center line of the pair of split sheets P.

Next, the method for molding the resin panel 1 will be explained.

Firstly, as illustrated in FIG. 11, the resin sheets P in a molten state are extruded vertically downward from the respective die slits from the extruder 60. This extruded resin sheets P are respectively fed to space between the pair of split molds 71A, 71B through rollers 65A, 65B. At this time point, the pair of split molds 71A, 71B is in an open position.

In the case in which a decoration sheet (for example, a decoration sheet made of a fabric) is added to the surface of the resin panel 1, the resin sheets P, which are hung down, and the decoration sheet can be attached to each other by pressurization by the rollers 65A, 65B. At this time, the inner surface of the decoration sheet may be preferably made of fabric to strengthen welding with the resin sheets P. The surfaces of the rollers 65A, 65B may be preferably coated with fluorine thin films and heated to about 70° C. to 100° C. for preventing the adhesion of the resin and for improving the welding strength.

Furthermore, decoration sheets on the forming surfaces of the split molds may be installed in advance, and the resin sheets P may be welded to the decoration sheets simultaneously with the molding of the resin sheets P.

In applying decoration sheet made of fabric, a nonwoven fabric may be preferably used. Especially, it is preferable to use a needle-punched nonwoven fabric formed by mechanically bonding fibers by pricking with needles each having a barb, in view of improvement of welding strength.

Figure 12:
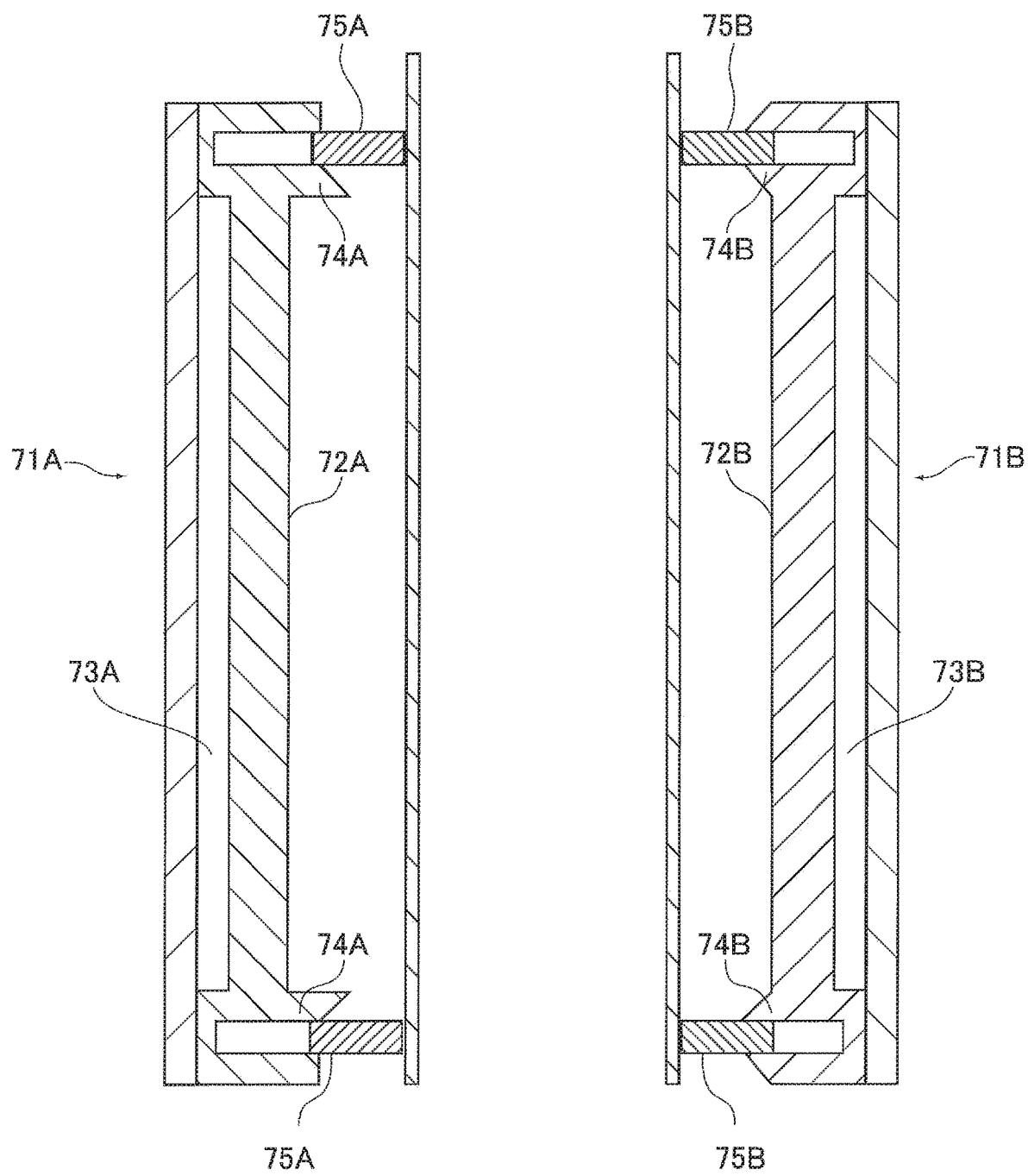
FIG. 12 is a drawing illustrating a state in which cavities are formed between resin sheets and forming surfaces of split molds in a method for molding a resin panel of a present embodiment.
Figure 13:
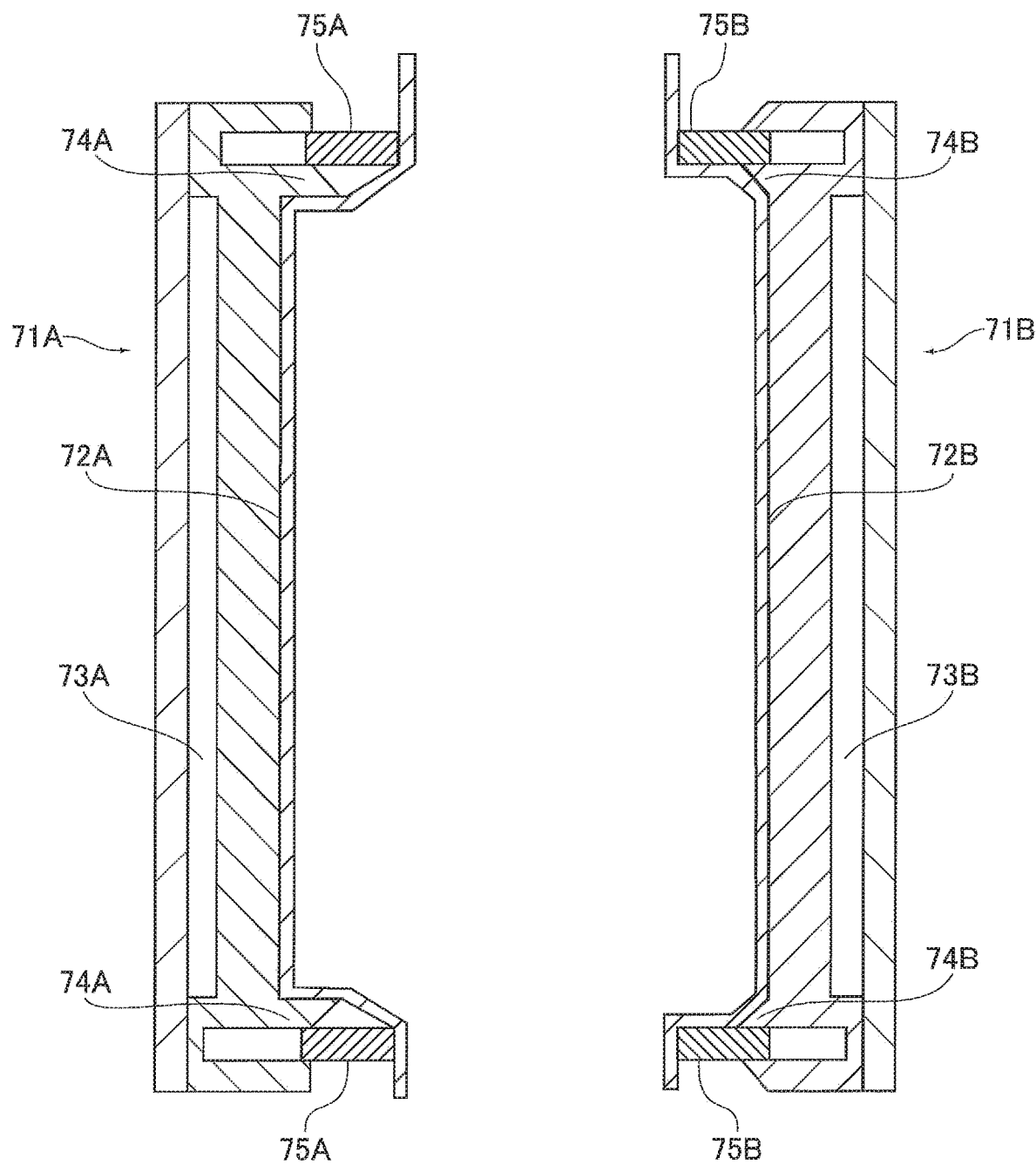
FIG. 13 is a drawing illustrating a state in which resin sheets have been formed in shapes along with forming surfaces of split molds in a method for molding a resin panel of a present embodiment.

Next, as illustrated in FIG. 12, the sliding parts 75A, 75B, which are disposed at the circumferences of the forming surfaces 72A, 72B, are projected so that the end planes of the sliding parts 75A, 75B comes into contact with the resin sheets P. Cavities are then formed between the resin sheets P and the forming surfaces 72A, 72B of the pair of split molds 71A, 71B. Furthermore, air in the cavities is sucked by the passages (not illustrated) that are disposed between the vacuum chambers 73A, 73B and the forming surfaces 72A, 72B. With this suction, the two resin sheets P are respectively pressed against the forming surfaces 72A, 728 of the pair of split molds 71A, 71B, and are formed into shapes that corresponds to the forming surfaces 72A, 72B, i.e., the approximate outer shape of the resin panel 1, as illustrated in FIG. 13.

Arrangement may be made such that air at the side of the resin sheets P is sucked from the tips of the sliding parts 75A, 75B, which are disposed on the circumferences of the forming surfaces 72A, 72B. This arrangement allows sure retainment of the resin sheet P while being in contact with the sliding parts 75A, 75B. Furthermore, this arrangement allows suppression of generation of wrinkles when forming the resin sheets P into shapes that corresponds to the forming surfaces 72A, 72B by sucking air from the cavities.

Figure 14:
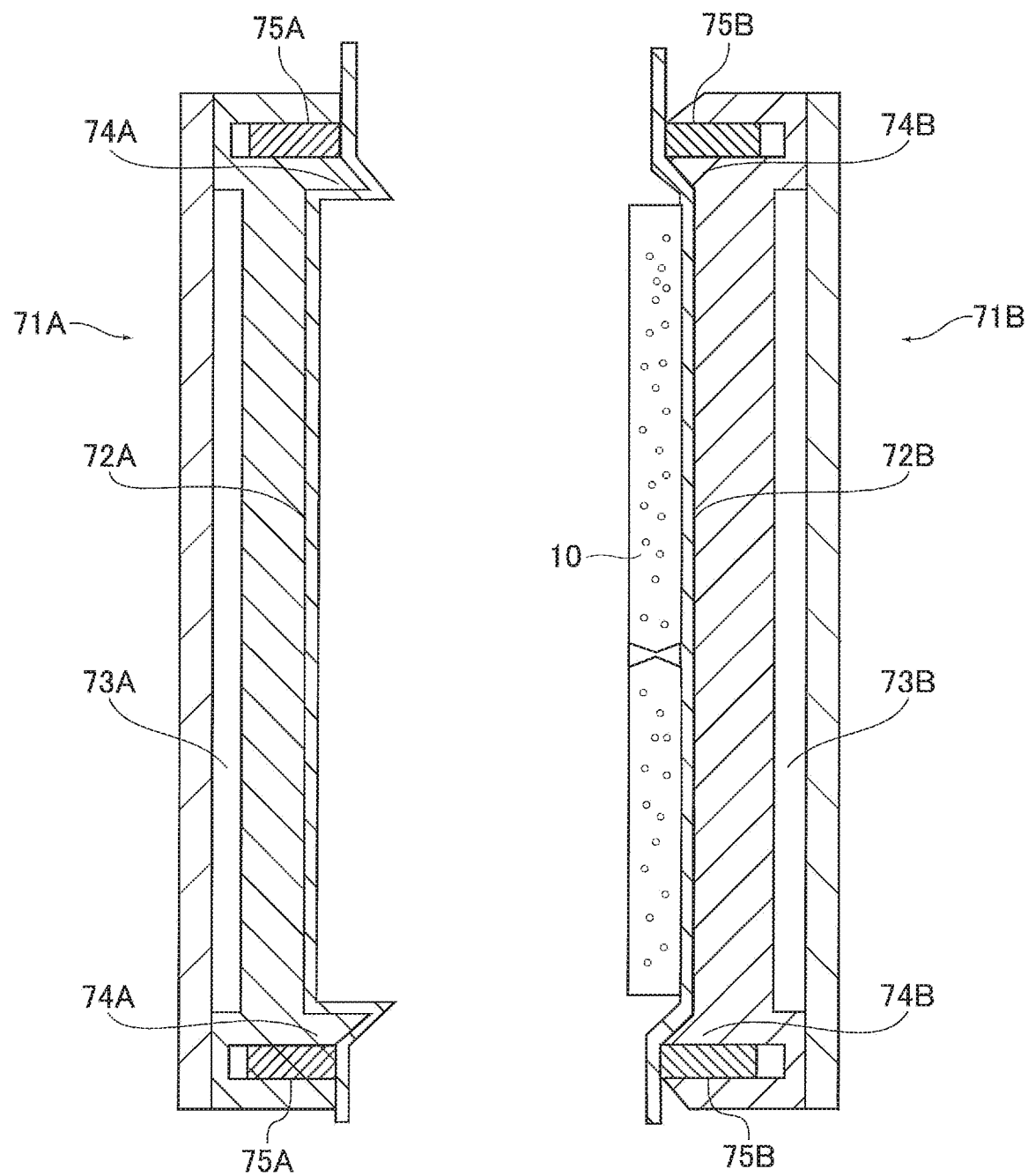
FIG. 14 is a drawing illustrating a state in which a core material is inserted into split molds in a method for molding a resin panel of a present embodiment.

Next, an interior material 10 is positioned between the pair of split molds 71A, 71B by using a manipulator (not illustrated), and the interior material 10 is inserted so as to be pressed against one of the split molds (the split mold 71B in FIG. 14) as illustrated in FIG. 14. Thereby, The interior material 10 is welded to the resin sheet P. The resin sheets P shrink by about 1% due to cooling after the molding depending on the resin material. The shapes of the forming surfaces 72A, 72B of the split molds 71A, 71B are preset in considering with such shrinking. In other words, the forming surfaces 72A, 72B are preset to be slightly larger than the target sizes of the resin sheets after the molding. Therefore, the interior material 10 in room temperature can be inserted into the split molds with margin.

Figure 15:
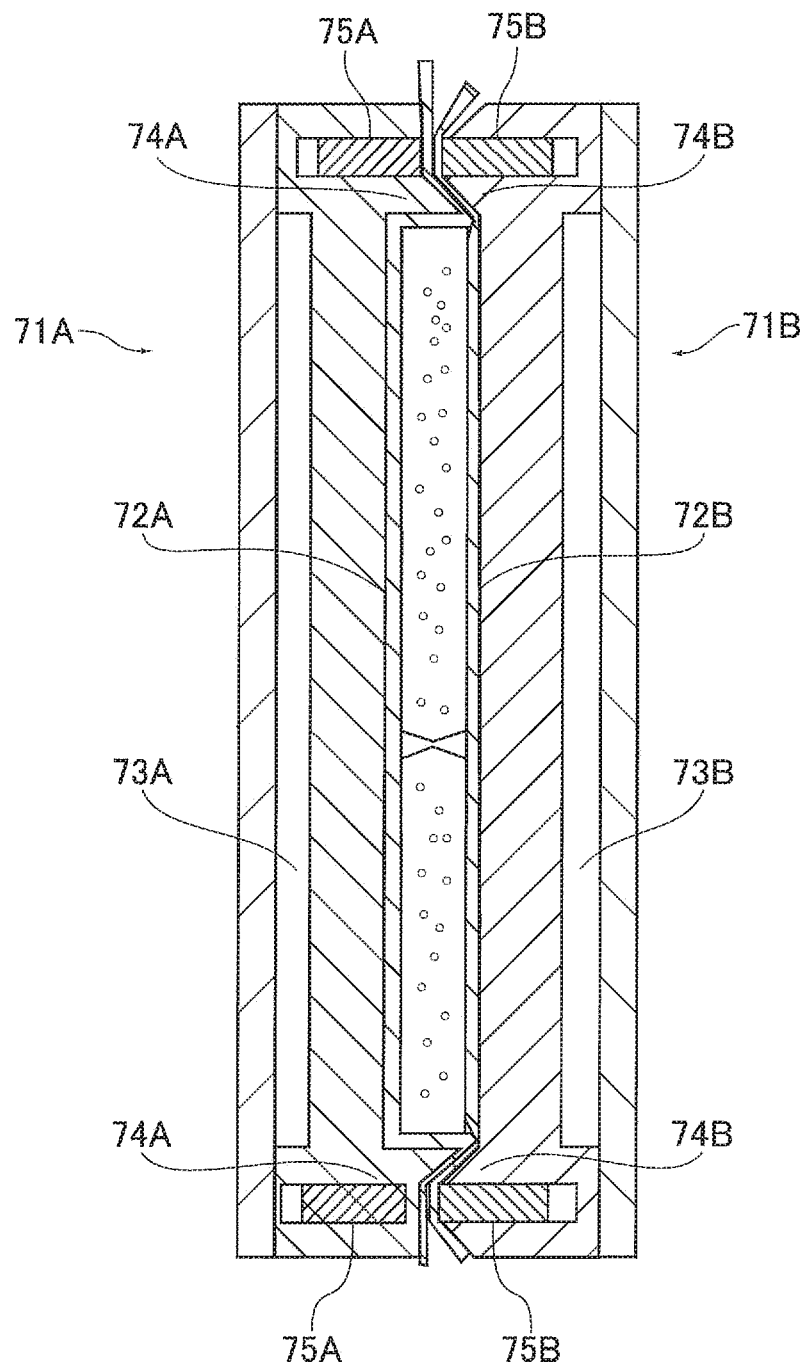
FIG. 15 is a drawing illustrating a state in which split molds have been moved to a close position in a method for molding a resin panel of a present embodiment.

Next, as illustrated in FIG. 15, the pair of split molds 71A, 71B is moved from the open position to the close position to effect mold clamping. Thereby, the interior material 10 that has been welded to one resin sheet P (the right side in the drawing) is also welded to the other resin sheet P (the left side in the drawing). Furthermore, in the pinch off portions 74A, 74B of the pair of split molds 71A, 71B, the peripheral edges of the pair of resin sheets P are welded, and a parting line PL is then formed. In the mold clamping, in order to weld the interior material 10 in room temperature which has been molded in advance to the resin sheets P in a molten state, the interior material 10 is positioned in advance so that it is not deformed by the mold clamping.

Finally, the pair of split molds 71A, 71B is moved to the open position again, the molded resin panel 1 is separated from the forming surfaces 72A, 72B, and the burrs which have been formed around the parting lines PL are removed by cutting with a cutter or the like. The burrs may be preferably cut at the pinch off portions 74A, 74B simultaneously with mold clamping. In the way mentioned above, the resin panel 1 in which the resin sheet SA, the interior material 10 and the resin sheet SB are stacked is completed.

In addition, as mentioned above, a glass filler, an inorganic filler or a carbon filler may be incorporated in the resin sheets P for the purpose of increasing the stiffness and strength.

As mentioned above, according to the method in which the extruded resin sheets in a molten state are sandwiched with the split molds and welded to the interior material before the resin sheets are solidified, the costs for molding may be decreased. This is because a re-heating step for the resin sheets is unnecessary, in contrast with a method in which solidified resin sheets are heated again and melted to be welded to an interior material for example.

Furthermore, since the present embodiment applies extrusion of the resin sheets in a molten state vertically downward, area occupied by the manufacturing apparatus may decreased. In the case in which molding is performed by extruding in the horizontal direction for example, a conveyer for conveying the resin sheets in the horizontal direction would be separately required, and it would be also required to align such conveyer and an extruder in a horizontal direction.

It should be noted that the method for molding the resin panel which has been described above according to the present embodiment may be suitably modified. Modified examples of the method for molding the resin panel according to the present embodiment will be explained hereinafter.

Modified Example 1

The present embodiment for molding a resin panel, which is described above, applies the method in which the pair of T dies extrudes the resin sheets in a molten state; however, alternatively a cylindrical parison may be extruded while being cut.

Modified Example 2

The present embodiment for molding a resin panel, which is described above, applies the method in which the cavities are formed between the resin sheets P and the forming surfaces 72A, 72B of the pair of split molds 71A, 71B before the pair of split molds 71A, 71B are moved to the close position; however, the present invention is not limited to this specific method. That is, the cavities may be formed by moving the pair of split molds 71A, 71B to the close position.

Modified Example 3

The present embodiment for molding a resin panel, which is described above, applies the method in which the air inside of the cavities is sucked so as to press the resin sheets P against the forming surfaces 72A, 72B of the pair of split molds 71A, 71B by pressurization; however, the present invention is not limited to this specific method. That is, the resin sheets P may be pressed against the forming surfaces 72A, 72B of the pair of split molds 71A, 71B by blowing a fluid such as air to the resin sheets P (namely, blow molding).

Modified Example 4

The present embodiment for molding a resin panel, which is described above, applies the method in which the step of pressing the outer layers of the resin sheets in a molten state against the forming surfaces of the split molds is performed with suction of air from the cavities or with blow molding; however, the present invention is not limited to this specific method. That is, the resin sheets in a molten state are pressed against the forming surfaces of the split molds by using the interior material 10 without forming the cavities. This method will be explained with reference to FIG. 16 and FIG. 17.

Figure 16:
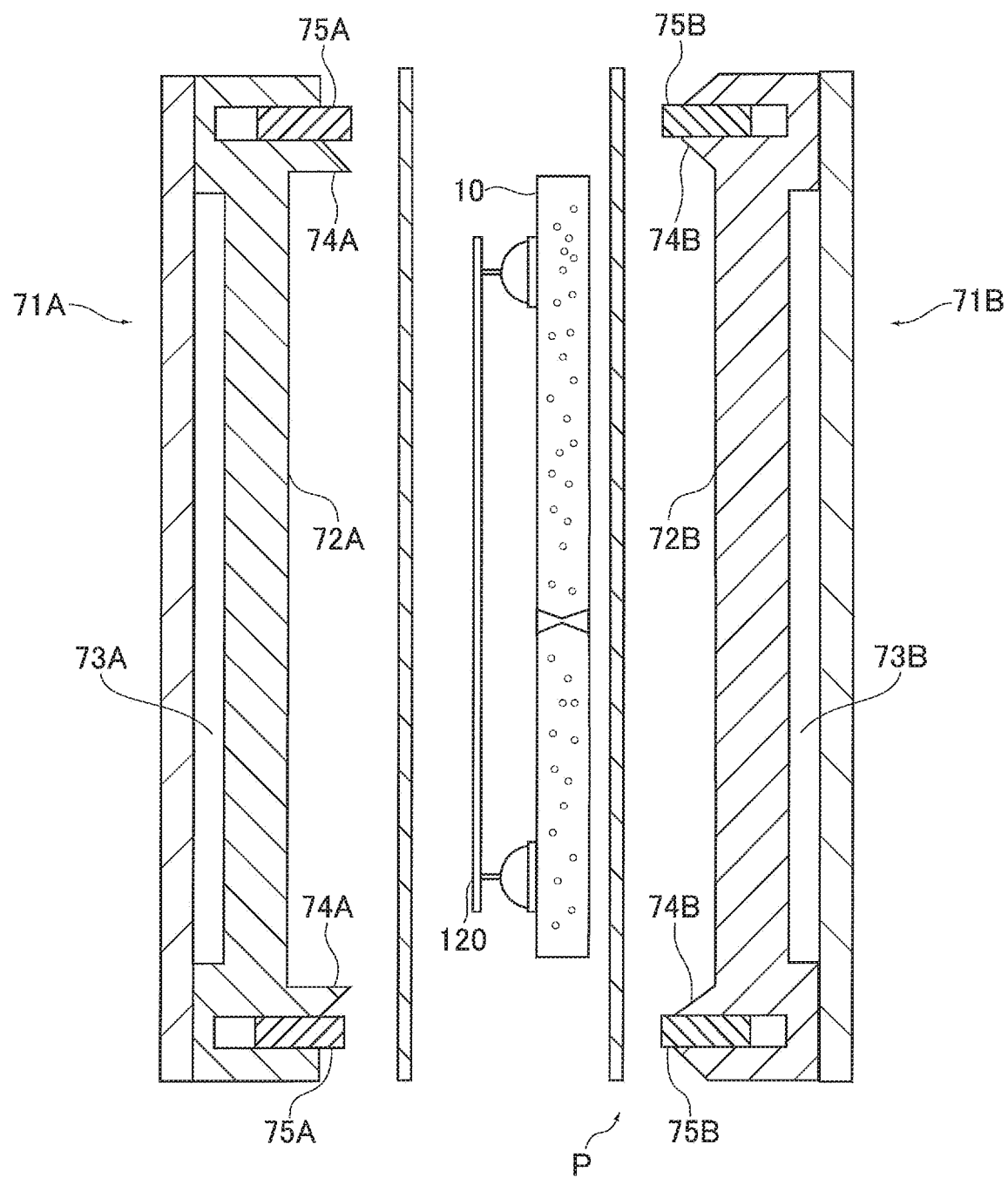
FIG. 16 is a drawing illustrating a state before pressing a core material against a resin sheet in a molten state in a modified example of a present embodiment.
Figure 17:
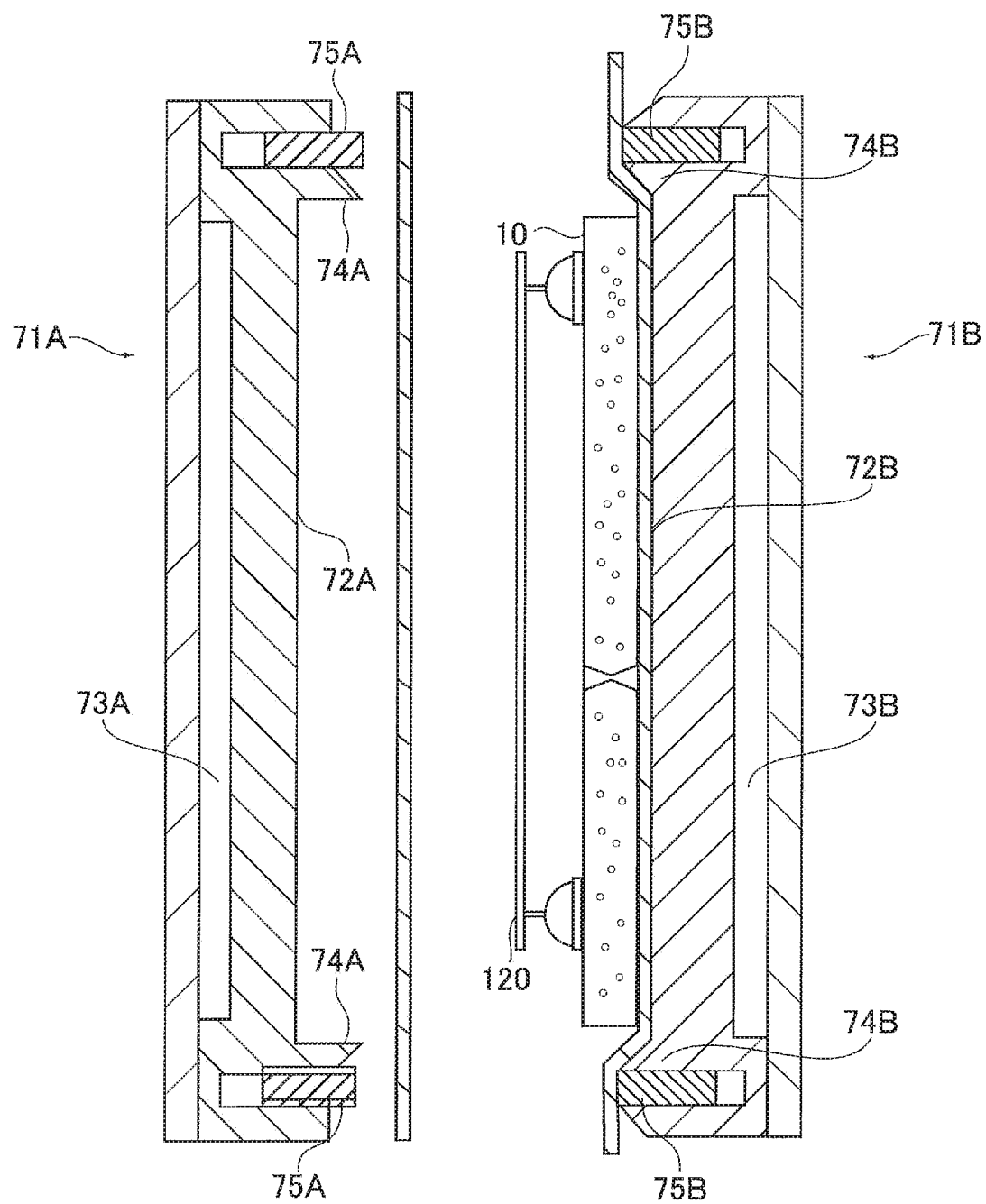
FIG. 17 is a drawing illustrating a state after a core material has been pressed against a resin sheet in a molten state until reaching the forming surfaces of the split molds in a modified example of a present embodiment.

FIG. 16 is a drawing illustrating a state before pressing interior material 10 against the resin sheets in a molten state. FIG. 17 is a drawing illustrating a state after the interior material 10 has been pressed against the resin sheets in a molten state until reaching the forming surfaces of the split molds.

In the method of this modified example, firstly, As illustrated in FIG. 16, the interior material 10 that is held by a manipulator 120 is positioned on a position such that the manipulator 120 so as to face the split mold 71B across the resin sheet P, while the resin sheets P in a molten state are extruded vertically downward from the extruder 60 (the same as in FIG. 11). Once the interior material 10 has been positioned, the manipulator 120 that retains the interior material 10 is moved toward the forming surface 72B of the split mold 71B. The interior material 10 is then brought into contact with the resin sheet P in a molten state, and the interior material 10 and the resin sheet P are welded. While the resin sheet P is in contact with the interior material 10, the resin sheet P in a molten state is not in contact with the split mold 71B, which has high heat conductivity. Thus, the resin sheet P is retained at a relatively high temperature. Therefore, the interior material 10 and the resin sheet P are finely welded.

When the manipulator 120 has been further moved, and the outer layer of the resin sheet P has reached the forming surface 72B of the split mold 71B, the manipulator 120 is in the state illustrated in FIG. 17. At this time, the outer layer of the resin sheet P is pressed against the forming surface 72B by the manipulator 120 through the interior material 10. The manipulator 120 is then removed from the interior material 10.

The following steps are the same as ones mentioned above.

Namely, as illustrated in FIG. 15, the pair of split molds 71A, 71B is moved from the open position to the close position to effect mold clamping. With this movement, the interior material 10 that has been welded to one resin sheet P (the right side in the drawing) is also welded to the other resin sheet P (the left side in the drawing). Furthermore, the pair of resin sheets is pressed against the forming surfaces 72A, 72B of the split molds 71A, 71B, thereby, as illustrated in FIG. 13, forming the resin sheets into the shapes that correspond to the forming surfaces 72A, 72B, i.e., the approximate outer form of the resin panel 1. The peripheral edges of the pair of resin sheets P are welded at the pinch off portions 74A, 74B of the pair of split molds 71A, 71B, and the parting line PL is then formed. Finally, the pair of split molds 71A, 71B is moved to the open position again, and the molded resin panel 1 is separated from the forming surfaces 72A, 72B. The burrs which have been formed around the parting line PL are removed by cutting with cutter or the like. In the way mentioned above, the resin panel 1, in which the resin sheet SA, the interior material 10 and the resin sheet SB are stacked, is completed.

The present embodiments of the present invention have been explained above in detail; however, the foam structural material and the manufacturing method therefor, and the resin panel and the manufacturing method therefor of the present invention are not limited to those mentioned above according to the present embodiment. As a matter of course, various improvements and modifications may be carried out within the scope as long as they do not deviate from the gist of the present invention.

For example, application the foam structural material according to the present invention is not limited to use as an interior material of a resin panel. Without being covered with resin sheets, the foam structural material according to the present invention may be used as it is for the purpose of a reinforcing element, a buffer element, a heat-insulating element or the like. More specifically, the foam structural material according to the present invention may be used with being fixed on a plate material formed of wood or the like, or sandwiched by that plate material.

What is claimed is:

1. A foam structural material comprising:
   a first core material having a first portion of a linear groove part being formed along an edge of the first core material, and
   a reinforcing material having a first side fitted to the first portion of the linear groove part,
   wherein the first portion of the linear groove part includes a first engagement plane,
   the first engagement plane has one or a plurality of projections formed on a part of the first engagement plane along a longitudinal direction thereof and on a side of a top surface of the first core material, and is engaged with the reinforcing material,
   the plurality of the projections has a width smaller than a width of the first engagement plane in a direction along the top surface of the first core material and perpendicular to an extending direction of the linear groove part, and is configured to press the reinforcing material when the first engagement plane is engaged with the reinforcing material.

2. The foam structural material according to claim 1, further comprising a second core material, a second portion of a linear groove part being formed along an edge of the second core material,
   wherein the reinforcing material has a second side fitted to the second portion of the linear groove part, the reinforcing material securing the first core material to the second core material,
   wherein the reinforcing material has an H-shaped cross-sectional surface, and the second portion of the linear groove part includes a second engagement plane, the second engagement plane being engaged with the reinforcing material and having one or a plurality of projections formed thereon.

3. The foam structural material according to claim 2, further comprising
   stoppers are formed at opposite ends of the first portion of the linear groove part and the second portion of the linear groove part for preventing the reinforcing material from separating.

4. The foam structural material according to claim 2, wherein
   each of the first portion and the second portion of the linear groove part includes a plurality of shallow grooves and a plurality of deep grooves, each shallow groove and each deep groove being alternately aligned.

5. The foam structural material according to claim 3, wherein
   each of the first portion and the second portion of the linear groove part includes a plurality of shallow grooves and a plurality of deep grooves, each shallow groove and each deep groove being alternately aligned.

* * * * *